(12) United States Patent
Chambers et al.

(10) Patent No.: US 10,956,213 B1
(45) Date of Patent: Mar. 23, 2021

(54) AUTOMATED WORKFLOW CREATION AND MANAGEMENT

(71) Applicant: State Farm Mutual Automobile Insurance Company, Bloomington, IL (US)

(72) Inventors: Anthony L. Chambers, Downs, IL (US); Ryan C. Ash, Normal, IL (US); Brian L. Detweiler, Bloomington, IL (US); Kevin J. Schmidgall, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 16/577,412

(22) Filed: Sep. 20, 2019

Related U.S. Application Data

(63) Continuation of application No. 14/959,778, filed on Dec. 4, 2015, now Pat. No. 10,467,050.

(60) Provisional application No. 62/193,425, filed on Jul. 16, 2015, provisional application No. 62/143,625, filed on Apr. 6, 2015.

(51) Int. Cl.
*G06F 9/48* (2006.01)
*G06F 3/0484* (2013.01)

(52) U.S. Cl.
CPC ........ *G06F 9/4881* (2013.01); *G06F 3/04842* (2013.01)

(58) Field of Classification Search
CPC ............................ G06F 9/4881; G06F 3/04842
See application file for complete search history.

(56) References Cited

U.S. PATENT DOCUMENTS

| | | | |
|---|---|---|---|
| 10,467,050 B1 | 11/2019 | Schmidgall et al. | |
| 2006/0069605 A1* | 3/2006 | Hatoun | G06Q 10/06316 |
| | | | 705/7.15 |
| 2008/0243902 A1* | 10/2008 | Rong | G06Q 10/06 |
| 2013/0232463 A1 | 9/2013 | Nagaraja et al. | |

(Continued)

OTHER PUBLICATIONS

"Automated Monitoring and Event Recovery of VBLOCK Infrastructure Platforms with Ipsoft Managed Service," The Virtual Computing Environment Company (VCE Company, LLC), 2011; 20 pgs.

(Continued)

*Primary Examiner* — Sisley N Kim

(57) ABSTRACT

A Workflow Engine and an associated User Interface configured to substantially automate aspects of the creation and management of a Workflow comprising a plurality of related jobs. The Workflow Engine employs a declarative web interface design with reduced or no required coding, reuses jobs for automating the same task in different contexts, employs declarative sequencing of jobs with reduced or no required coding, and uses job templating to increase or ensure consistent configurations across multiple job invocations. Users select and modify jobs from a library of existing jobs, and create new jobs as needed. The Workflow executes the jobs according to a Flow Script and communicates output data between jobs to satisfy dependencies. The User Interface allows users to monitor and manage the jobs and the Workflow, including creating an interactive visual presentation of job dependencies.

20 Claims, 18 Drawing Sheets

(56) References Cited

U.S. PATENT DOCUMENTS

| | | | |
|---|---|---|---|
| 2014/0337071 A1 | 11/2014 | Stiffler et al. | |
| 2015/0160969 A1* | 6/2015 | Kishore | G06F 3/04842 718/102 |
| 2015/0160974 A1 | 6/2015 | Kishore et al. | |
| 2015/0278287 A1* | 10/2015 | Takaishi | G06F 16/2365 707/690 |

OTHER PUBLICATIONS

"HP Operations Orchestration Software Data Sheet," Hewlett Packard, Mar. 2016; 20 pages.
"IBM BPM: A Smarter Process Approach to Accelerating Customer Engagements with Mobile and Social", IBM Software Business Process Management, 2013; 32 pages.
"Ansible Documentation, Release 1.7," Ansible, Jul. 14, 2014; 66 pages.

\* cited by examiner

| | | | |
|---|---|---|---|
| 2 | flow_openam | revert | Revert from a backout set of OpenAM/OpenDJ VMs (move from backout to active) | No restrictions |
| 3 | flow_openam | destroy | Destroy checkout and/or backout OpenAM/OpenDJ deployments | No restrictions |
| 4 | flow_testDataManagement | provision | Perform scrub/restore of data to all pods in an environment | No restrictions |
| 5 | flow_postgres | upgrade | Universal flow for Postgres upgrades | No restrictions |
| 6 | flow_postgres | upgrade_siony | Postgres siony in place upgrade | No restrictions |
| 7 | flow_postgres | destroy | Destroy postgres HAG | No restrictions |

Flow Templates: Some flows will utilize templates that are prebuilt and hold variables which are required for the related jobs

| Parent Directory | Parent Versions | Parent Sizes | Action Directory Properties |
|---|---|---|---|
| applyRhelPatches | | | patch (Show) |
| ci | | | daily (Show) |
| emmet | | | runJob (Show) |
| genfire | 1.2.0 | medium<br>small | restart (Show)<br>provision (Show)<br>healthCheck (Show)<br>upgrade (Show)<br>switch_profile (Show)<br>rebalance (Show)<br>destroy (Show) |
| hag | 3.0.0<br>4.0.0<br>test1 | large-default<br>large<br>medium<br>small<br>xlarge | provision (Show) |
| jiranges | | | |
| mgs | 1.0.5 | | add (Show) |
| networkCore | | | provisionAppCore (Show)<br>provisionSvcCore (Show) |
| odm | 1.0.5 WCDM 7.5<br>1.0.6 WCDM 7.5<br>0 | | provision (Show)<br>upgrade (Show) |

| Flow Information | Status | Started | Finish | Options | Actions |
|---|---|---|---|---|---|
| pmgt, provision, lab2 turntingsvc | SUCCESSFUL | Wed Mar 18 22:50:02 2015 | Wed Mar 18 23:49:46 2015 | Hidden due to minimize | View Logs |
| risk, provision, isbx witman | SUCCESSFUL | Wed Mar 18 18:01:16 2015 | Wed Mar 18 20:18:19 2015 | Hidden due to minimize | View Logs |
| adm, provision, isbx davincipvc | SUCCESSFUL | Wed Mar 18 15:36:25 2015 | Wed Mar 18 15:52:15 2015 | Hidden due to minimize | View Logs |
| postgres, upgrade, skinny, lab2 risk omstate | SUCCESSFUL | Tue Mar 17 18:00:42 2015 | Tue Mar 17 18:11:22 2015 | Hidden due to minimize | View Logs |
| adm, provision, lab1 tpubl | SUCCESSFUL | Tue Mar 17 01:17:21 2015 | Tue Mar 17 01:37:21 2015 | Hidden due to minimize | View Logs |
| vds, view, lab1 ldap-am-lab1-lsu best.statefarm.com | SUCCESSFUL | Thu Mar 19 16:13:55 2015 | Thu Mar 19 16:14:20 2015 | Hidden due to minimize | View Logs |

Fig. 14.

State Farm — PI Automation Portal

Emmet

Tabs: About | Flow Template Information | Initiate Flow | Initiate Job | Flow Tracking | Flow Watch | Waka Flags

Flow Information (84)

- Name: riak
- Action: provision
- Target: rstbx wittman
- Initiated by: Srihanth Reddy Mulanti
- View Flow Log
- View Timeline
- View Dependency
- Flow Watch Link (sharing)
- Wiki Documentation Auto-refresh OFF    Admin-mode OFF

| Flow Status | Start Date Time | Finish Date Time | Options |
|---|---|---|---|
| SUCCESSFUL | Wed Mar 18 22:50:02 2015 | Wed Mar 18 23:49:46 2015 | Hidden due to minimize |
| Job Summary: SUCCESSFUL: 34 TOTAL: 34 | | | Hidden due to minimize<br>Hidden due to minimize |

Refresh Interval: 15 seconds

| Job Description | Job Status | Start Date Time | Finish Date Time | Change Job Status |
|---|---|---|---|---|
| Remove waka flag | SUCCESSFUL | 2015-3-18 20:18:16 (Wed) | 2015-3-18 20:18:18 (Wed) | |
| Validatemultisite replication | SUCCESSFUL | 2015-3-18 20:39:07 (Wed) | 2015-3-18 20:17:58 (Wed) | |
| DNS create alias riak | SUCCESSFUL | 2015-3-18 18:39:05 (Wed) | 2015-3-18 18:39:06 (Wed) | |
| DNS create alias riaqa | SUCCESSFUL | 2015-3-18 18:39:05 (Wed) | 2015-3-18 18:39:06 (Wed) | |
| LTM createVirtual internal riak corp | SUCCESSFUL | 2015-3-18 18:39:02 (Wed) | 2015-3-18 18:39:04 (Wed) | |
| LTM createVirtual internal riakqa corp | SUCCESSFUL | 2015-3-18 18:39:02 (Wed) | 2015-3-18 18:39:04 (Wed) | |
| LTM createPool internal riakqa corp | SUCCESSFUL | 2015-3-18 18:38:55 (Wed) | 2015-3-18 18:39:01 (Wed) | |
| LTM createPool internal riak corp | SUCCESSFUL | 2015-3-18 18:38:55 (Wed) | 2015-3-18 18:38:58 (Wed) | |
| Validate corp QA cluster | SUCCESSFUL | 2015-3-18 18:37:03 (Wed) | 2015-3-18 18:36:54 (Wed) | |
| Validate corp HA cluster | SUCCESSFUL | 2015-3-18 18:37:03 (Wed) | 2015-3-18 18:36:51 (Wed) | |
| Provision backup in corp | SUCCESSFUL | 2015-3-18 18:17:31 (Wed) | 2015-3-18 18:35:48 (Wed) | |

State Farm

Emmet — 58 — PI Automation Portal

| About | Flow Template Information | Initiate Flow | Initiate Job | Flow Tracking | Flow Watch | Waka Flags |

Waka Flags provide our business partners the capability to see related active or completed flows. Emmet and Governor will present users with a list of related flows and ask for confirmation before starting a flow. This allows the users to see what other activities may currently be active for a given target (environment and pod usually). This tab provides users the view and manage Waka Flags outside of flows.

Create a new Waka Flag
*Show*

Manage existing Waka Flags

| Flow | Actions | Target | Note | User | Date | Actions |
|---|---|---|---|---|---|---|
| postgres | upgrade_stony | haqapas | 20150318-perf-testing | Duane Rensby | Wed Mar 18 15:55:25 2015 | Delete |
| pmgt | provision | istix.turingsvc | PMGT Provision Flow | Jonathan Lagman | Wed Mar 18 22:05:03 2015 | Delete |

AUTOMATED WORKFLOW CREATION AND MANAGEMENT

RELATED APPLICATIONS

The present application is a continuation of U.S. application Ser. No. 14/959,778, filed Dec. 4, 2015, titled "Automated Workflow Creation and Management", which claims priority to U.S. Provisional Application No. 62/143,625, filed Apr. 6, 2015, titled "Automated Workflow Creation and Management," and of a second U.S. Provisional Application titled "Automated Workflow Creation and Management," Ser. No. 62/193,425, filed Jul. 16, 2015, the disclosures of which are hereby incorporated by reference in their entireties.

FIELD OF THE INVENTION

The present disclosure generally relates to methods and systems for creating and managing project workflows, and, more particularly, to workflow engines and associated user interfaces configured to substantially automate aspects of creating, executing, and monitoring workflows.

BACKGROUND

Organizations may provide platforms for hosting applications, and installing and operating such computing environments may involve many repetitive tasks. The underlying infrastructure of such a platform may be complicated and may involve large and complicated procedures for day-to-day support and upgrades, and problems related to manual configuration and administration may impact availability. The initial build-out of the platform involves manually creating and managing the workflow, including manually building server pods, configuring load balancers, and building infrastructure components, and every workflow may have its own custom user interface. System administrators may use a wide variety of tools to partially automate these tasks, from custom standalone scripts running on a user's workstation to expensive third-party products requiring substantial infrastructure (web servers, application servers, database servers, etc.), but problems may still arise and workflow creation and management efficiency may be improved.

BRIEF SUMMARY

The present embodiments may relate to, inter alia, a workflow engine and an associated user interface configured to substantially automate aspects of the creation and management of a workflow comprising a plurality of related jobs. The workflow engine employs a declarative web interface design with reduced or no required coding, reuses jobs for automating the same task in different contexts, employs declarative sequencing of jobs with reduced or no required coding, and/or uses job templating to increase or ensure consistent configurations across multiple job invocations. Users select and modify jobs from a library of existing jobs, and/or create new jobs as needed. The workflow executes according to a flow script and communicates output data between jobs to satisfy dependencies. The user interface allows the user to monitor and manage the jobs and the workflow, including creating a visual presentation of job dependencies.

In one aspect, a computer-implemented method may be provided for configuring and managing aspects of a workflow. The workflow may include a plurality of jobs, and each job may include one or more parameters and/or one or more dependencies on other jobs. Among the various steps that may be part of the computer-implemented method, a library of existing jobs may be provided and stored on a memory element. A user interface may be configured to allow a user to access the library of existing jobs and select one or more jobs from the library of existing jobs to include among the plurality of jobs in the workflow. The user interface may be configured to allow the user to modify the parameters and/or dependencies of the selected jobs. Any such modifications may be substantially automatically translated to any of the selected jobs having dependencies on the modified jobs. The user interface may be configured to allow the user to create one or more new jobs to include among the plurality of jobs in the workflow. A template may be substantially automatically created which specifies the dependencies between the plurality of jobs. The user interface may be configured to allow the user to modify the template. The workflow may be executed in accordance with the template, including communicating output data between the plurality of jobs to satisfy the dependencies. The user interface may be configured to communicate a status of each job to the user as execution of the workflow progresses. The user interface may be configured to allow the user to review the status of each job, view the dependencies of each job, track the progress of the workflow, halt and resume the workflow, and/or view a record of the workflow such that configuring and/or managing aspects of the workflow is facilitated. The computer-implemented method may include additional, fewer, or alternative steps, including those discussed elsewhere herein.

In another aspect, a computing system may be provided for configuring and managing aspects of a workflow. The workflow may include a plurality of jobs, and each job may include one or more parameters and/or one or more dependencies on other jobs. The computing system may comprise a communication element configured to receive and transmit communications via a network, a memory element configured to store a library of existing jobs, and/or a processing element electronically coupled to the communication element and the memory element and configured to perform various actions. Among the various actions that may be performed by the processing element, a user interface may be configured to allow a user to access the library of existing jobs and/or select one or more jobs from the library of existing jobs to include among the plurality of jobs in the workflow. The user interface may be configured to allow the user to modify the parameters and/or dependencies of the selected jobs. Any such modifications may be substantially automatically translated to any of the selected jobs having dependencies on the modified jobs. The user interface may be configured to allow the user to create one or more new jobs to include among the plurality of jobs in the workflow. A template may be substantially automatically created which specifies the dependencies between the plurality of jobs. The user interface may be configured to allow the user to modify the template. The workflow may be executed in accordance with the template, including communicating output data between the plurality of jobs to satisfy the dependencies. The user interface may be configured to communicate a status of each job to the user as execution of the workflow progresses. The user interface may be configured to allow the user to review the status of each job, view the dependencies of each job, track the progress of the workflow, halt and resume the workflow, and/or view a record of the workflow such that configuring and/or managing aspects of the workflow is facilitated. The computing system and the actions performed by the processing element may include additional, fewer, or alternative components or actions, including those discussed elsewhere herein.

In another aspect, a non-transitory computer-readable medium with an executable program stored thereon may be provided for configuring and managing aspects of a workflow. The workflow may include a plurality of jobs, and each job may include one or more parameters and/or one or more dependencies on other jobs. The program may instruct a processing element of a computing system to perform various actions. Among the various actions that the program may instruct the processing element to perform, a library of existing jobs may be provided and stored on a memory element. A user interface may be configured to allow a user to access the library of existing jobs and select one or more jobs from the library of existing jobs to include among the plurality of jobs in the workflow. The user interface may be configured to allow the user to modify the parameters and/or dependencies of the selected jobs. Any such modifications may be substantially automatically translated to any of the selected jobs having dependencies on the modified jobs. The user interface may be configured to allow the user to create one or more new jobs to include among the plurality of jobs in the workflow. A template may be substantially automatically created which specifies the dependencies between the plurality of jobs. The user interface may be configured to allow the user to modify the template. The workflow may be executed in accordance with the template, including communicating output data between the plurality of jobs to satisfy the dependencies. The user interface may be configured to communicate a status of each job to the user as execution of the workflow progresses. The user interface may be configured to allow the user to review the status of each job, view the dependencies of each job, track the progress of the workflow, halt and resume the workflow, and/or view a record of the workflow. The program stored on the non-transitory computer readable medium may include instructions for additional, fewer, or alternative actions, including those discussed elsewhere herein.

Each of the aforementioned aspects may further include any one or more of the following additional or alternative features. The user interface may be a common interface for configuring and managing aspects of a plurality of different workflows. The steps or actions may be performed on a single virtual machine with no external databases. The plurality of jobs may be written in different programming languages. A standard interface may be prescribed for invoking each job, a standard output convention may be prescribed for indicating success or failure of each job and for sharing data between the plurality of jobs, and/or a standard set of parameters may be prescribed for invoking the workflow. A set of rules may be prescribed for declaring an execution sequence of the plurality of jobs. A filtering mechanism may be defined for declaring whether a particular job should be excluded from the workflow based upon a run-time context during execution of the workflow. A cloning mechanism may be defined for generating multiple jobs from a single job specification based upon a dynamic output during execution of the workflow. A file template format may be defined for generating a set of job specifications, wherein generating the set of job specifications may include substituting a variable, replicating an input based upon a variable containing a value, managing a variable that references an output from another job, and/or defining a dependency, filter, and clone for a particular job. The user interface may be configured to allow the user to execute the workflow in a preview mode in order to provide the user with a listing of one or more actual jobs that would execute in a particular context, but without actually executing the actual jobs.

Each job may be substantially automatically assigned a job type from a plurality of predefined job types, and the user interface may be configured to allow the user to change the job type of each job. The predefined job types may include a "normal" job type which identifies a job that may be substantially automatically executed to successful completion; a "validation" job type which identifies a job that makes no changes but rather gathers data for use by other jobs; and/or a "human" job type which identifies a job that requires human intervention to complete. The user interface may be configured to allow the user to change the job types of the plurality of jobs with a single command. The statuses of the plurality of jobs may be tracked as the workflow progresses, and/or the user interface may be configured to allow the user to resume execution of the workflow at a point of failure, based upon the tracked statuses of the jobs at the point of failure. The output data of the plurality of jobs may be preserved. The invocation parameters of the workflow may be tracked. The user interface may be configured to allow the user to change the status of one or more jobs of the plurality of jobs. A target may be locked to prevent multiple users from running the same workflow against the target at the same time. A plug-in interface may be provided and configured to allow the user to modify a subset of functions to accommodate one or more different platforms. A declarative framework may be provided for defining the workflow without creating a custom code for the workflow. A potential conflict may be substantially automatically identified between a first workflow and a second workflow, and the potential conflict may be communicated via the user interface.

A dependency map may be created of all of the dependencies between the plurality of jobs, and a visual presentation of the dependency map may be created and communicated via the user interface, in which all of the dependencies between the plurality of jobs are indicated by lines extending between the plurality of jobs. The statuses of the plurality of jobs may be indicated in the visual presentation using a first color for completed jobs, a second color for running jobs, and a third color for pending jobs. The user interface may be configured to allow the user to select a job in the visual presentation of the dependency map, and view a description and details of the selected job. The user interface may be configured to allow the user to select a job in the visual presentation of the dependency map, and then move the selected job from a first position to a second position in the dependency map without changing the dependencies of the selected job. The user interface may be configured to allow the user to change the dependencies of the selected job by selecting and manipulating the lines indicating the dependencies. The user interface may be configured to allow the user to limit the visual presentation of the dependency map to a first workflow or a first portion of the first workflow. A change in a second workflow or a second portion of the first workflow which is not shown in the limited visual presentation may be communicated to the user. The user interface may be configured to allow the user to change the status of a job in order to cause the job to be skipped or to be rerun.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 7 is a second screen capture associated with the first exemplary tab or screen;

FIG. 9 is a second screen capture associated with the second exemplary tab or screen;

FIG. 11 is a second screen capture associated with the third exemplary tab or screen;

FIG. 13 is a second screen capture associated with the fourth exemplary tab or screen;

FIG. 14 is a third screen capture associated with the fourth exemplary tab or screen;

FIG. 16 is a second screen capture associated with the fifth exemplary tab or screen;

FIG. 17 is a screen capture associated with a sixth exemplary tab or screen; and FIG. 18 is a second screen capture associated with the sixth exemplary tab or screen.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
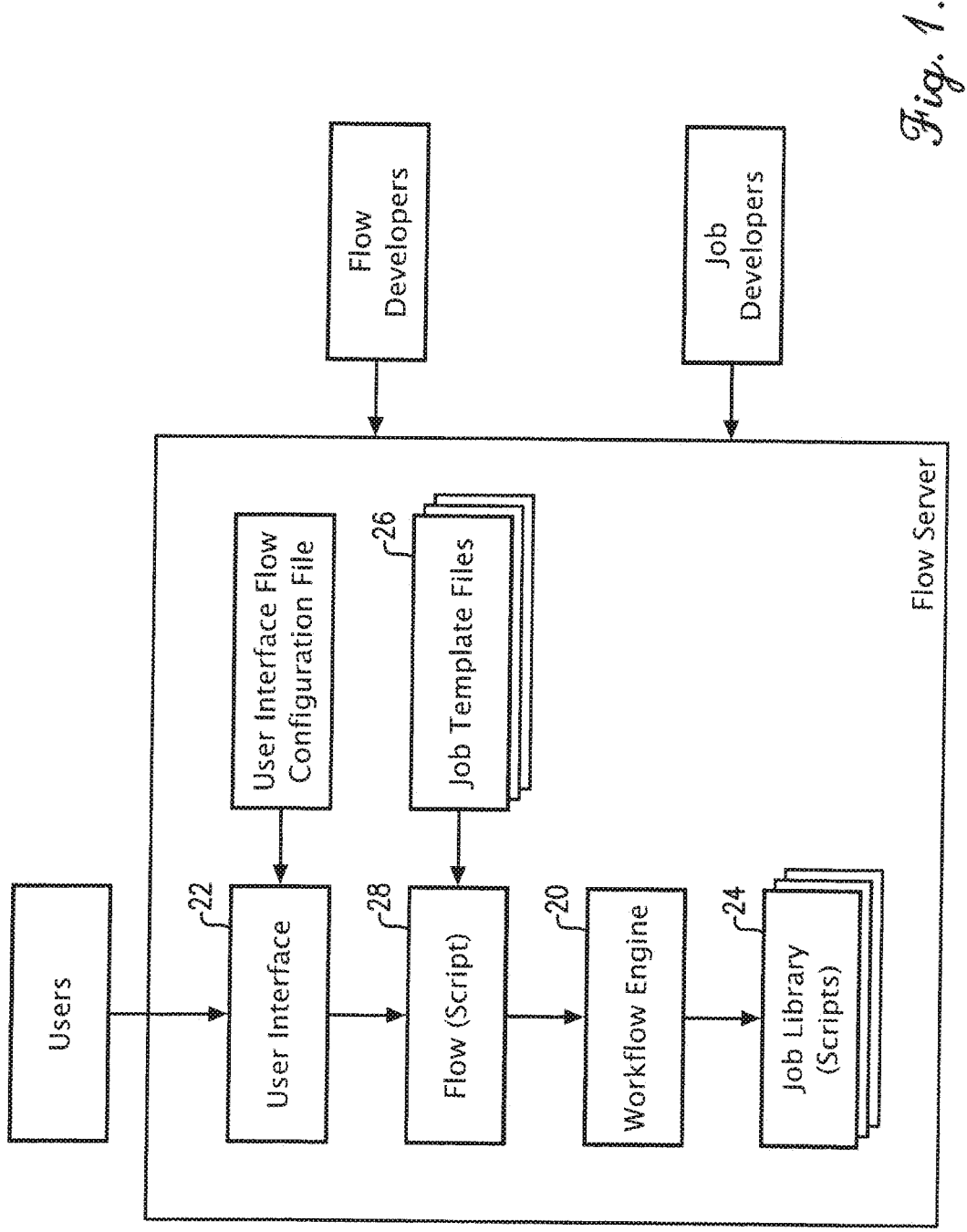
FIG. 1 is a depiction of a system including embodiments of an exemplary Workflow Engine and an exemplary User Interface.

Referring to FIG. 1, the present embodiments may relate to, inter alia, a Workflow Engine 20 and an associated User Interface 22 configured to substantially automate aspects of the creation and management of a plurality of related jobs. A job (or step) may be a custom script that performs a specific task such as, for example, provisioning a virtual server or restarting a server. The present embodiments may provide a library of existing jobs 24 from which a user may choose the plurality of related jobs using the User Interface 22. The plurality of related jobs may be referred to as a "Workflow."

Each job may have one or more parameters and/or one or more dependencies on other jobs, wherein a dependency between a first job and a second job may include reliance by the first job on one or more outputs of the second job. Users may be allowed to modify the parameters and/or dependencies of existing jobs in the library 24, in which case such modifications may be substantially automatically translated to all other jobs having dependency relationships with the modified jobs. Additionally, users may be allowed to create entirely new jobs.

The Workflow Engine 20 may substantially automatically create a Template 26 which specifies the dependencies between the plurality of related jobs. The Template 26 may dictate how the jobs are invoked during execution of the Workflow. Templates 26 may be wholly static or at least partially dynamic, e.g., partially configurable. The user may be allowed to modify the Template. Thus, to create a new Workflow, the user may construct a Flow Script 28 by selecting existing jobs from the library 24 and making any needed changes to parameters and/or dependencies, and/or creating new jobs, and reviewing and making any necessary or desired changes to the Template 26.

The Workflow Engine 20 may then substantially automatically connect and coordinate individual jobs across different platforms, and substantially automatically execute the Flow Script 28 based upon the Template 26, and data is passed between jobs to satisfy the dependencies. The Workflow Engine 20 may communicate via the User Interface 22 the statuses of jobs (e.g., completed, running, pending) as the Workflow progresses. The user may be allowed via the User Interface 22 to review the status of each job, track the progress of the Workflow, halt the Workflow, watch the progress of the Workflow, view a timeline for the Workflow, view any dependencies of each job, resume and reset the Workflow, and/or view a log or other record of the Workflow.

While each Workflow may employ a custom Flow Script 28, the Workflow Engine 20 may offload much of the logic for executing jobs, tracking their statuses, passing data between jobs, etc. It may do this based upon directives in the Template 26. The extent of the custom Flow Script 28 for each Workflow may be reduced by functionality and/or directives added to the Workflow Engine 20 and Template 26. Thus, the user may be able to construct a new Workflow, including a web-based interface in the User Interface 22, without any HTML/javascript/perl coding.

The User Interface 22 may be a menu-driven web-interface used to access all Workflows based upon the Workflow Engine 20. The User Interface 22 may be used by all users for all Workflows, in contrast to prior art solutions which may use a custom interface for each Workflow. The User Interface 22 may employ a simple data file to tell the User Interface 22 how to invoke and interact with Workflow.

The Workflow Engine 20 and the User Interface 22 may be a set of PERL scripts and PERL modules that make writing custom automation tools more simple, consistent, and reliable. In particular, the User Interface 22 may be a combination of PERL Cgi, javascript, j query, html, and css. Together, the Workflow Engine 20 and User Interface 22 may reduce the time required to configure a Workflow from weeks to days.

Thus, broadly characterized, the Workflow Engine 20 may employ a declarative web interface design with reduced or no required HTML/javascript coding, may reuse code (jobs) for automating the same task in different contexts, may employ declarative sequencing of jobs with reduced or no required coding, and/or may use job templating to increase or ensure consistent configurations across multiple job invocations.

The present embodiments may be variously characterized as a computer-implemented method, a non-transitory computer-readable medium containing an executable program, or a computing system executing the program to implement the method. Users of the present embodiments may be, for example, developers seeking to deploy and test products.

Specific embodiments of the technology will now be described. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense. The scope of the present invention is defined only by the appended claims, along with the full scope of equivalents to which the claims are entitled.

I. Exemplary Computer System

Figure 2:
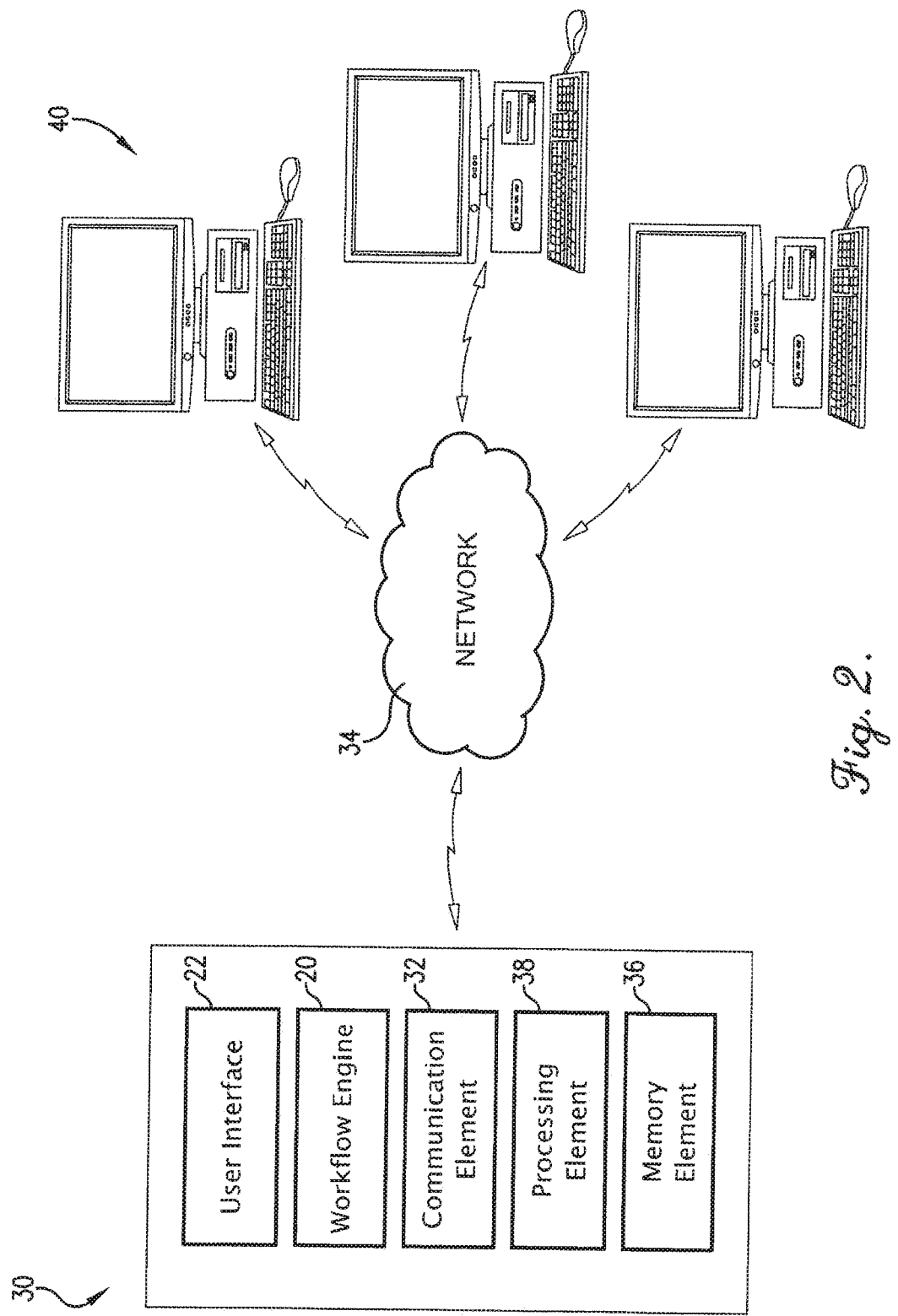
FIG. 2 is a depiction of an embodiment of a computing system configured to implement the exemplary Workflow Engine and the exemplary User Interface of FIG. 1.

FIG. 2 depicts an exemplary computing environment including an embodiment of a computing device 30 for implementing the Workflow Engine 20 and User Interface 22 for configuring and managing aspects of a Workflow. The Workflow may include a plurality of jobs, and each job may include one or more parameters and/or one or more dependencies on other jobs. The computing system 30 may broadly comprise a communication element 32 configured to receive and transmit communications via a network 34, a memory element 36 configured to store the library of existing jobs 24, and/or a processing element 38 electronically coupled to the communication element 32 and memory element 36 and configured to perform various actions.

The communication element 32 may generally allow for communication with external systems or devices employed by users to access the Workflow Engine 20 and User Interface 22 implemented by the system 30. The communication element 32 may include signal or data transmitting and receiving circuits, such as antennas, amplifiers, filters, mixers, oscillators, digital signal processors (DSPs), and the like. The communication element 32 may establish communication wirelessly by utilizing radio-frequency (RF) signals and/or data that comply with communication standards such as cellular 2G, 3G, or 4G, IEEE 802.11 standard (such as WiFi), IEEE 802.16 standard (such as WiMAX), Bluetooth™, or combinations thereof.

Alternatively, or in addition, the communication element 32 may establish communication through connectors or couplers that receive metal conductor wires or cables which are compatible with networking technologies, such as Ethernet. In certain embodiments, the communication element 32 may also couple with optical fiber cables. The communication element 32 may be electronically coupled or otherwise in electronic communication with the memory element 36 and the processing element 38.

The network 34 may be embodied by a local, metro, or wide area network (LAN, MAN, or WAN) and may be formed using a plurality of known architectures and topologies. In some embodiments, a portion of the network 34 may be formed by at least a portion of the Internet, by communication lines that are leased from other entities, or by combinations thereof. The network 34 may be implemented within a small space such as an office or a building or across a larger space such as a city, a region, or a country. Thus, users of the present embodiments may access the computing system 30 via the network 34 from locally or remotely located computer terminals 40.

The memory element 36 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 36 may include, or may constitute, a "computer-readable medium." The memory element 36 may store the instructions, code, code segments, software, firmware, programs, applications, apps, services, daemons, or the like that are executed by the processing element 38. The memory element 36 may also store settings, data, documents, sound files, photographs, movies, images, databases, and the like.

The processing element 38 may include one or more processors, microprocessors, microcontrollers, DSPs, field-programmable gate arrays (FPGAs), analog and/or digital application-specific integrated circuits (ASICs), or the like, or combinations thereof. The processing element 38 may generally execute, process, or run instructions, code, code segments, software, firmware, programs, applications, apps, processes, services, daemons, or the like. The processing element 38 may also include hardware components such as finite-state machines, sequential and combinational logic, and other electronic circuits that can perform the functions necessary for the operation of embodiments of the current inventive concept. The processing element 38 may be in communication with the other electronic components through serial or parallel links that include address busses, data busses, control lines, and the like.

Figure 3:
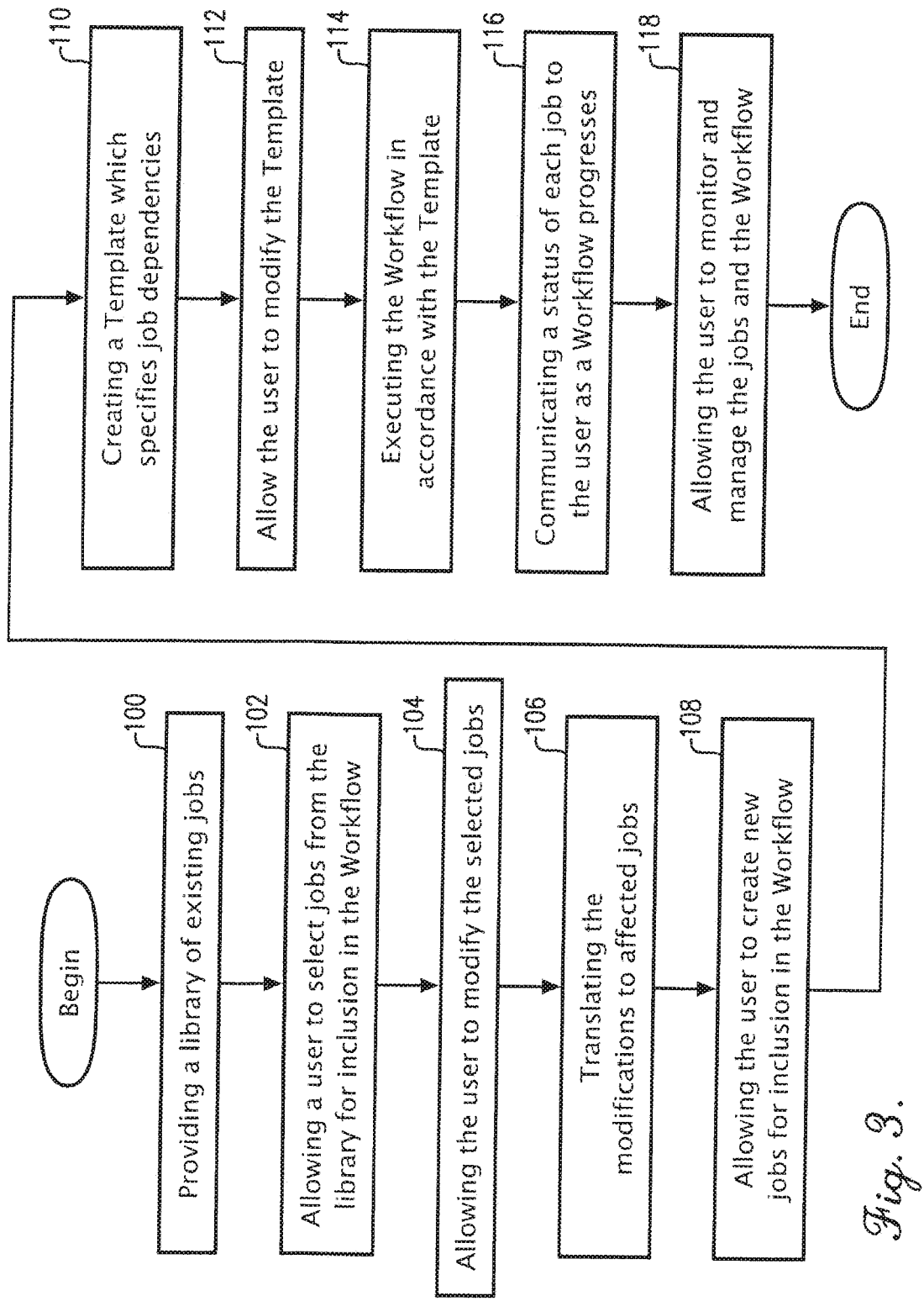
FIG. 3 is a flowchart of steps or actions performed by the exemplary Workflow Engine and exemplary User Interface of FIG. 1.

Referring also to FIG. 3, among the various actions that may be performed by the processing element, the User Interface 22 may be configured to allow a user to access the library of existing jobs 24 and select one or more jobs from the library of existing jobs 24 to include among the plurality of jobs in the Workflow, as shown in action 102. The User Interface 22 may be configured to allow the user to modify the parameters and/or dependencies of the selected jobs, as shown in action 104. Any such modifications may be substantially automatically translated to any of the selected jobs having dependencies on the modified jobs, as shown in action 106.

The User Interface 22 may be configured to allow the user to create one or more new jobs to include among the plurality of jobs in the Workflow, as shown in action 108. The Template 26 may be substantially automatically created which specifies the dependencies between the plurality of jobs, as shown in action 110. The User Interface 22 may be configured to allow the user to modify the Template 26, as shown in action 112. The Workflow may be executed in accordance with the Template 26, including communicating output data between the plurality of jobs to satisfy the dependencies, as shown in action 114. The User Interface 22 may be configured to communicate a status of each job to the user as execution of the Workflow progresses, as shown in action 116. The User Interface 22 may be configured to allow the user to review the status of each job, view the dependencies of each job, track the progress of the Workflow, halt and resume the Workflow, and/or view a record of the Workflow, as shown in action 118.

The processing element 38 may perform these and other actions on a single virtual machine with no external databases. More specifically, the Workflow Engine 20 may have a relatively small footprint in that it may not require external databases and may run on a single virtual machine using basic operating system functionality. This increases resiliency to infrastructure outages, and allows users to utilize Workflow Engine-based tools for recovering from such outages. This also simplifies bootstrapping new computing environments, in that the only required manual step may be to stand-up a single server/virtual machine.

The computing system 30 and the actions performed by the processing element 38 may include additional, fewer, or alternative components or actions, including those discussed elsewhere herein, and particularly the additional features discussed in the section describing the computer-implemented method.

II. Exemplary Computer-Implemented Method

FIG. 3 depicts an exemplary computing-implemented method for implementing the Workflow Engine 20 and User Interface 22 for configuring and managing aspects of a Workflow. The Workflow may include a plurality of jobs, and each job may include one or more parameters and/or one or more dependencies on other jobs. Among the various steps that may be part the computer-implemented method, the library of existing jobs 24 may be provided and stored on the memory element 36, as shown in step 100. The User Interface 22 may be configured to allow a user to access the library of existing jobs 24 and select one or more jobs from the library of existing jobs 24 to include among the plurality of jobs in the Workflow, as shown in step 102. The User Interface 22 may be configured to allow the user to modify the parameters and/or dependencies of the selected jobs, as shown in step 104. Any such modifications may be substantially automatically translated to any of the selected jobs having dependencies on the modified jobs, as shown in step 106.

The User Interface 22 may be configured to allow the user to create one or more new jobs to include among the plurality of jobs in the Workflow, as shown in step 108. The Template 26 may be substantially automatically created which specifies the dependencies between the plurality of jobs, as shown in step 110. The User Interface 22 may be configured to allow the user to modify the Template 26, as shown in step 112. The Workflow may be executed in accordance with the Template 26, including communicating output data between the plurality of jobs to satisfy the dependencies, as shown in step 114.

The User Interface 22 may be configured to communicate a status of each job to the user as execution of the Workflow progresses, as shown in step 116. The User Interface 22 may be configured to allow the user to review the status of each job, view the dependencies of each job, track the progress of the Workflow, halt and resume the Workflow, and/or view a record of the Workflow, as shown in step 118.

The computer-implemented method may include additional, fewer, or alternative features, including those discussed elsewhere herein. For example, the method may include any one or more of the following additional features. The User Interface 22 may be a common interface for configuring and managing aspects of a plurality of different Workflows, thereby avoiding the need to create a custom interface for each new Workflow. The method may be implemented on a single virtual machine with no external databases. The plurality of jobs may be written in the same programming language or in different programming languages.

A standard interface may be prescribed for invoking each job; a standard output convention may be prescribed for indicating success or failure of each job and for sharing data between the plurality of jobs; and/or a standard set of parameters may be prescribed for invoking the Workflow. More specifically, the Workflow Engine 20 may prescribe a standard job invocation interface (a single property file), may prescribe a standard job output convention to indicate job success or failure and for facilitating the sharing of data with other jobs, and/or may prescribe standard Workflow invocation parameters to ease integration with web-based user interfaces.

A set of rules may be prescribed for declaring an execution sequence of the plurality of jobs. More specifically, the Workflow Engine 20 may define a set of rules for declaring job execution sequences, wherein jobs may be run in parallel by default. For example, Static: job B declares that it must run after job A; Dynamic: job B declares that it must run after job A1, A2, etc., the number of which is not known until run-time; Dynamic: if job B references output from job A, a static dependency on job A may be set automatically for job B; Dynamic: if a dependent job (job A) is skipped due to a filter evaluated at run-time, the depending job (job B) may be allowed to run immediately, or, alternatively, if job B should not be run if job A is skipped, a filter may be set on job A's state.

Relatedly, a filtering mechanism may be defined for declaring whether a particular job should be excluded from the Workflow based upon a run-time context during execution of the Workflow. Also, in one aspect, a cloning mechanism may be defined for generating multiple jobs from a single job specification based upon a dynamic output during execution of the Workflow. In another aspect, a file template format may be defined for generating a set of job specifications, wherein generating the set of job specifications may include substituting a variable, replicating an input based upon a variable containing a value, managing a variable that references an output from another job, and/or defining a dependency, filter, and clone for a particular job.

The User Interface 22 may be configured to allow the user to execute the Workflow in a preview mode in order to provide the user with a listing of one or more actual jobs that would execute in a particular context, but without actually executing the actual jobs.

Each job may be substantially automatically assigned a job type from a plurality of predefined job types, and the User Interface 22 may be configured to allow the user to change the job type of each job, wherein the plurality of predefined job types include a "normal" job type which can be automatically executed to successful completion; a "validation" job type which identifies a job that makes no changes but rather gathers data for use by other jobs; and a "human" job type which identifies a job that requires human intervention to complete. More specifically, the Workflow Engine may provide a plurality of different job types.

For example, the "normal" job may be the default job type, and the "validation" job may be a job that makes no changes but rather gathers data for use by other jobs. The validation job type facilitates previewing the Workflow or part of the Workflow by identifying nodes but not taking any action. This may be useful for testing syntax or testing variable substitutions. Once jobs are validated, the user may be allowed to change them to a type (e.g., normal) that does take action. This change in type may be accomplished by allowing the user to change the types of all of the jobs to an actionable type with a single action via the User Interface 22. Normal-type and validation-type jobs may be executed even when the Workflow is run in preview mode.

The "human" job may be a job that requires human intervention to complete. Human-type jobs may halt further Workflow execution until the user manually marks the job as having successfully completed. Relatedly, the User Interface 22 may be configured to allow the user to change the job types of the plurality of jobs with a single command.

The statuses of the plurality of jobs may be tracked as the Workflow progresses, and the User Interface 22 may be configured to allow the user to resume execution of the Workflow at a point of failure, based upon the tracked statuses of the jobs at the point of failure. More specifically, the Workflow Engine 20 may track the states of the jobs as the Workflow progresses. If the Workflow fails, this allows the user to resume the Workflow at the point of failure rather than starting over which, for a Workflow with hundreds or even thousands of jobs, may save a substantial amount of time and/or resources. This also reduces job code complexity when a job must not run more than once against a given target.

The output data of the plurality of jobs may be preserved. More specifically, the Workflow Engine may preserve the outputs of the jobs as the Workflow progresses. The Flow Script may offload to the jobs the task of identifying and/or validating a target, thereby minimizing the code complexity that might otherwise be required to preserve the initial target context. This is especially useful for Workflows that upgrade an existing target.

The invocation parameters of the Workflow may be tracked. More specifically, the Workflow Engine may track the invocation parameters of the Workflow in order to prevent the user from mistakenly resuming a failed Workflow using different parameters which could corrupt the Workflow target.

The User Interface 22 may be configured to allow the user to change the status of one or more jobs of the plurality of jobs. More specifically, the Workflow Engine 20 may allow the user to override and change the status of a job. For example, the user may use this feature to change a job's status from completed to pending in order to rerun the already completed job, or to change a job's status from failed to successfully completed.

A target may be locked to prevent multiple users from running the same Workflow against the target at the same time. A plug-in interface may be provided and configured to allow the user to modify a subset of functions to accommodate one or more different platforms. A declarative framework may be provided for defining the Workflow without creating a custom code for the Workflow.

A potential conflict may be substantially automatically identified between a first Workflow and a second Workflow, and the potential conflict may be communicated via the User Interface 22. More specifically, the User Interface 22 may, as a Workflow begins, create a Conflict Flag indicating for the user what is being done and by whom. This allows other users to see, or be warned, that potential conflicts may exist when starting a new Workflow. This may be useful in situations in which Workflows run in parallel and operate in the same environments and on the same populations. Conflict Flags may be created and destroyed by the Workflow. Additionally or alternatively, Conflict Flags may be manually created by users, which may be useful in situations in which jobs are run outside of the User Interface 22. More broadly, such Flags may be used to apprise users of related Workflows, including activities that may involve particular targets (e.g., environments or pods).

Figure 4:
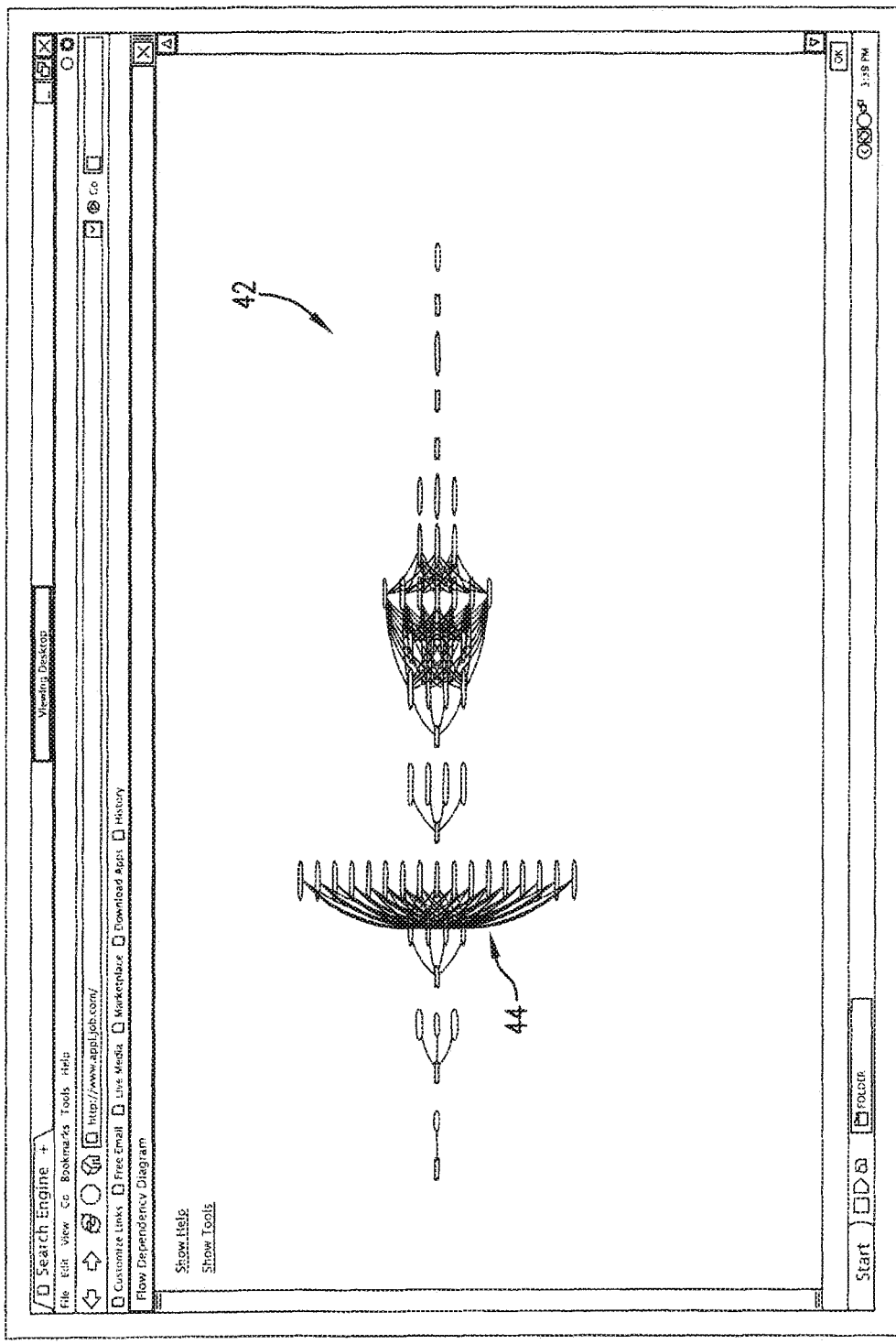
FIG. 4 is a screen capture of an exemplary visual presentation in the exemplary User Interface of a dependency map depicting a workflow being managed by the exemplary Workflow Engine.
Figure 5:
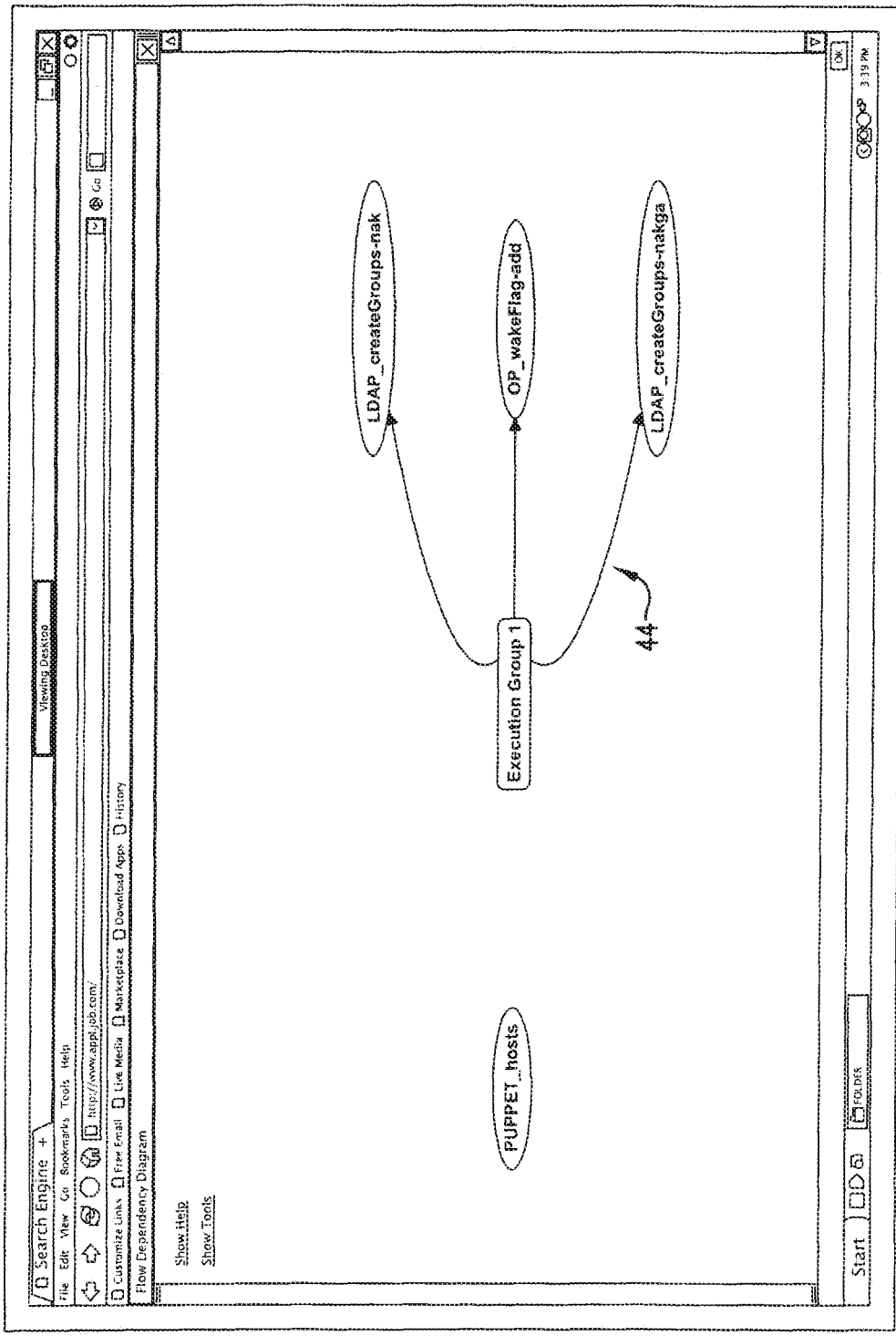
FIG. 5 is a screen capture of a portion of the exemplary visual presentation of FIG. 4.

Referring also to FIGS. 4 and 5, a dependency map 42 may be created of all of the dependencies between the plurality of jobs, and a visual presentation of the dependency map 42 may be created and communicated via the User Interface 22, in which all of the dependencies between the plurality of jobs are indicated by lines 44 extending between the plurality of jobs. The User Interface 22 may create the visual presentation using visjs. Visjs is an open source javascript library for visualization. This allows users to visualize Workflows and job interdependencies (which may become very complex in large Workflows). The User Interface 22 may allow the user to better view the dependency map 42 by zooming out (as seen in FIG. 4) or in (as seen in FIG. 5), isolating particular jobs or subgroups of jobs, etc.

Relatedly, the statuses of the plurality of jobs may be indicated in the visual presentation using a first color for completed jobs, a second color for running jobs, and a third color for pending jobs. Furthermore dependencies may be clearly indicated by lines extending between and connecting jobs. To further facilitate understanding, especially for large flows, the user may be allowed to identify subgroups of jobs within the larger Workflow. Subgroup identifiers may be denoted by a fourth color (e.g., orange).

The User Interface 22 may be configured to allow the user to cause a cursor to hover over or otherwise indicate or select a job in the visual presentation of the dependency map, and view a description and one or more details of the selected job.

The User Interface 22 may be configured to allow the user to "grab" or otherwise select a job in the visual presentation of the dependency map and move the selected job from a first position to a second position in the dependency map without changing the dependencies of the selected job. Relatedly, the User Interface 22 may be configured to allow the user to change the dependencies of the selected job by, for example, selecting and manipulating the lines indicating those dependencies. Furthermore, the user may be allowed to add or remove jobs by grabbing or otherwise selecting them.

The User Interface 22 may be configured to allow the user to limit the visual presentation of the dependency map to a first Workflow or a first portion of the first Workflow. More specifically, the User Interface 22 may allow the user to limit the visual presentation to a specific Workflow, a specific portion of a Workflow, or to Workflows in a specific environment. This feature may be useful when working on large projects with large numbers of Workflows. In effect, the visualization filters out the unspecified Workflows.

Relatedly, a change in a second Workflow or a second portion of the first Workflow which is not shown in the limited visual presentation may be communicated to the user. More specifically, a notification of a change in the status (e.g., halted, failed, completed) of a filtered Workflow or filtered portion of a Workflow may be communicated to the user to make them aware of the change in the non-visualized Workflow or portion of a Workflow. The notification may take the form of an audible and/or visual notification.

The User Interface 22 may be configured to allow the user to change the status of a job in order to cause the job to be skipped or to be rerun. For example, jobs may be rerun, stopped, or skipped; failed jobs may be marked as having been successfully completed in order to skip them; and successfully completed jobs may be marked as not having been run in order to rerun them.

The User Interface 22 may be configured to allow the user to review logs or other records of Workflows in order to diagnose the causes of failed Workflows. Because jobs are reused (and therefore highly tested), failed Workflows may likely be caused by problems with environments, Template details, or set-ups.

The User Interface 22 may involve unique input and constraints for each flow. These may be put into a JSON (data structure) file which the User Interface 22 then uses to ensure it has all of the necessary inputs prior to attempting to start the flow. This may allow the common User Interface 22 to service all Workflows and properly display their relevant information, such as wiki documentation and descriptions.

Figure 6:
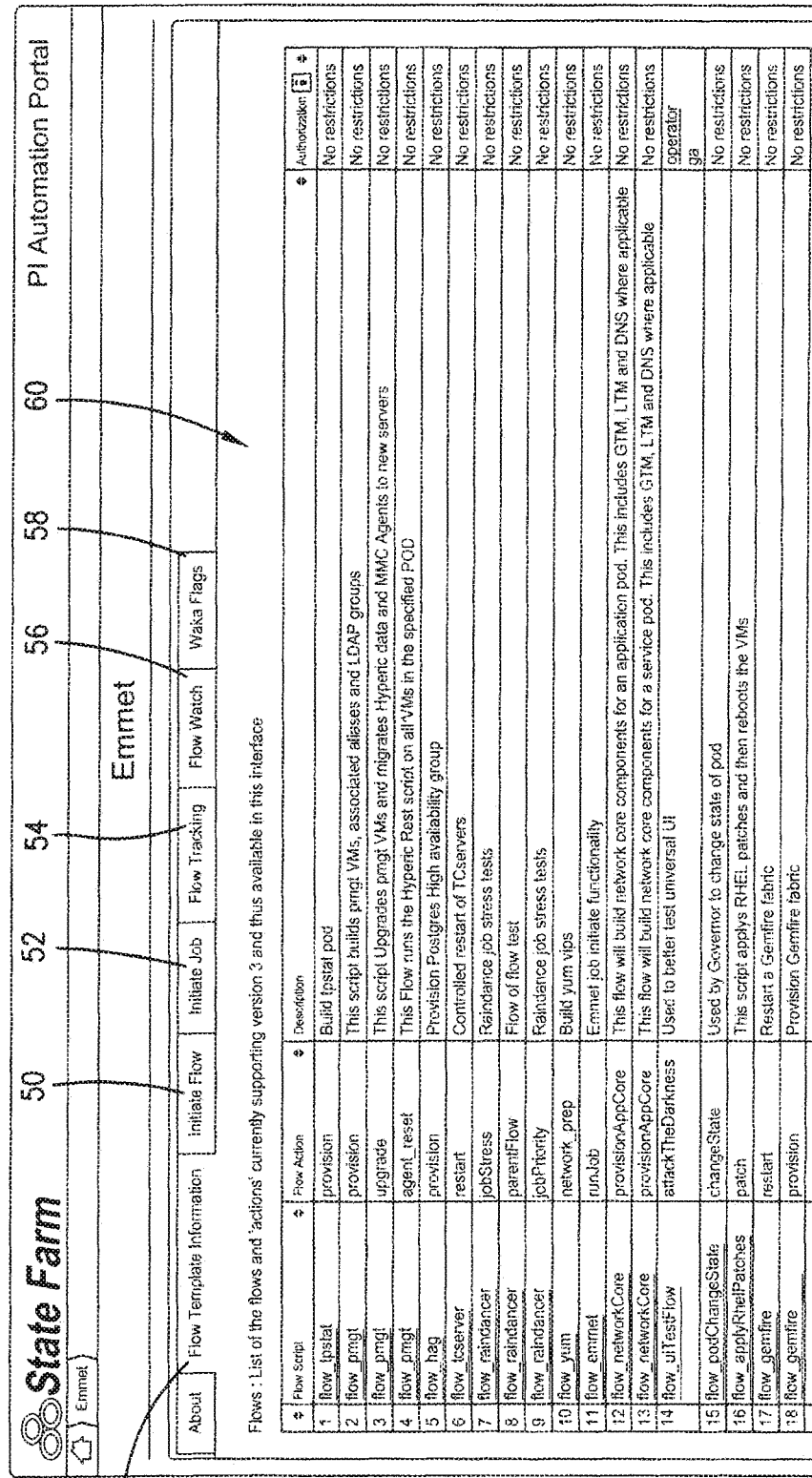
FIG. 6 is a screen capture of the exemplary User Interface, wherein the screen capture is associated with an exemplary first tab or screen.

As shown in FIGS. 6-18, in one implementation the exemplary User Interface 22 may include a plurality of tabs, such as a Flow/Template Information tab 48, an Initiate Flow tab 50, an Initiate Job tab 52, a Flow Tracking tab 54, a Flow Watch tab 56, and/or a Flag tab 58. Referring to FIGS. 6 and 7, the Flow/Template Information tab 48 may provide users with information about any available Workflows and/or actions, and allow them to view version and template files within each Workflow action. The user may be presented with a Flow table 60, which may include a list of available Workflow scripts, Workflow actions, descriptions, and authorizations. Each Workflow script may be associated with one more Workflow actions. The user may also be presented with a Template table 62, which may include a list of available templates, versions, and templatized jobs.

Figure 8:
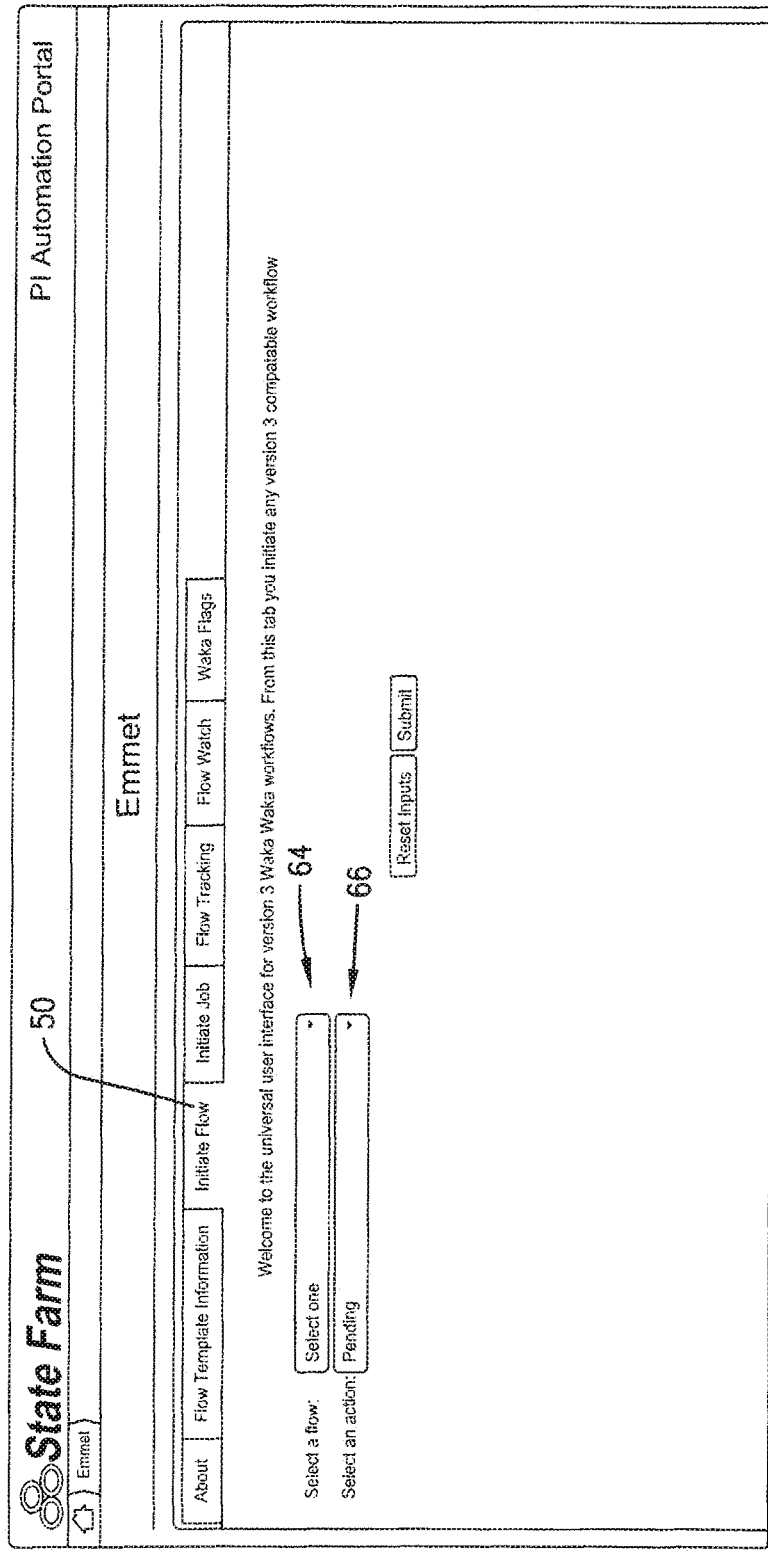
FIG. 8 is a screen capture associated with a second exemplary tab or screen.
Figure 9:
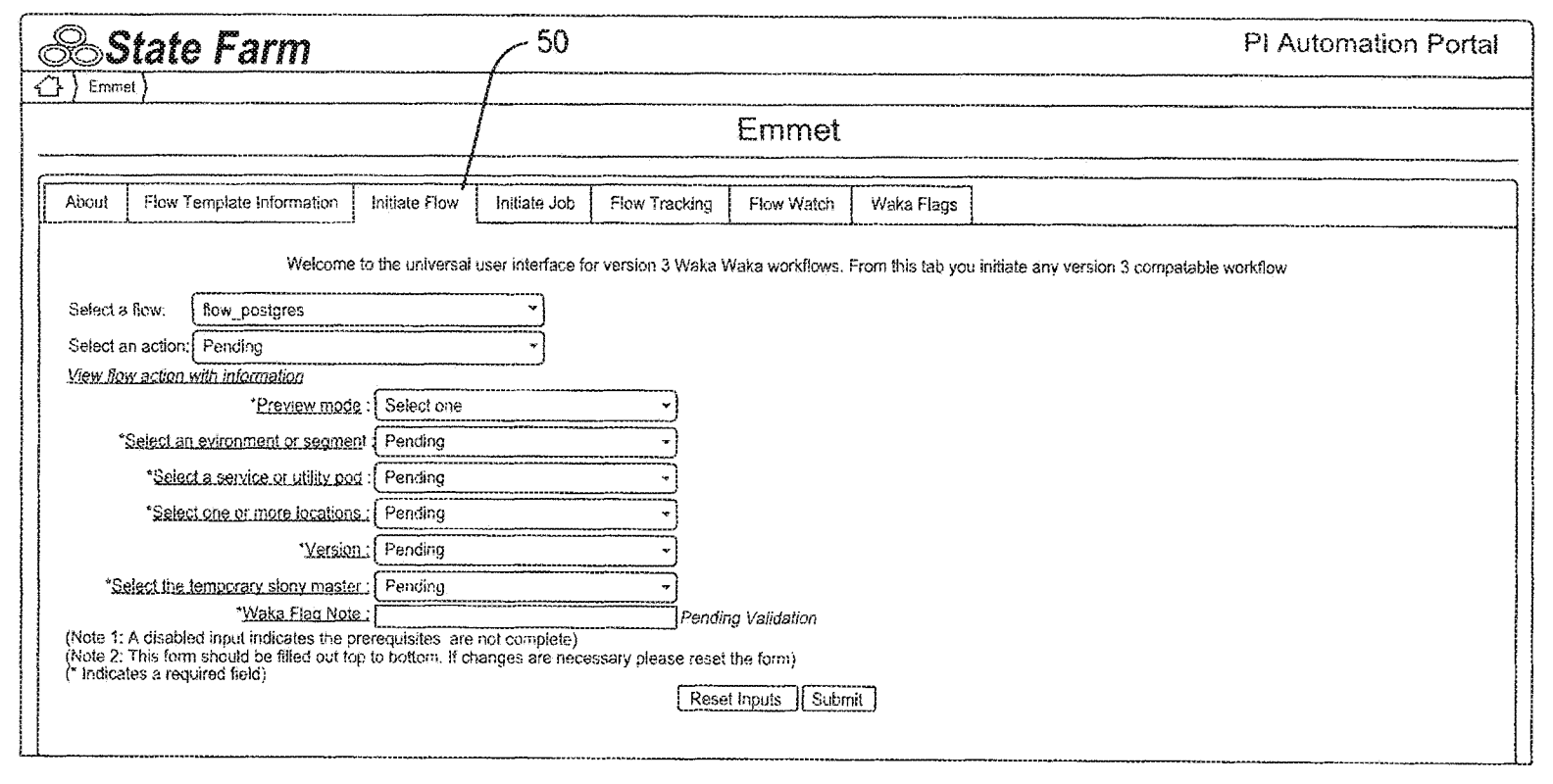

Referring to FIGS. 8 and 9, the Initiate Flow tab 50 may allow users to initiate available Workflows. The user may be presented with a pulldown list of selectable Workflows 64 and a pulldown list of selectable actions 66. The pulldown list of selectable Workflows 64 may allow the user to select a particular Workflow. The pulldown list of selectable actions 66 may allow the user to select an action to perform regarding the selected Workflow. The particular actions available for selection may be determined by the nature of the selected Workflow (i.e., all actions may not be available for all Workflows). After the user selects an action, various fields may be presented for the user to make any choices or provide any information necessary or useful in executing the selected action. These fields may include mode, target (e.g., environment and/or pod), location, and version. Depending on the nature of the field, making a selection in one field may determine the selections available in a subsequent field. Once the fields are completed, the User Interface 22 may automatically switch to the Flow Watch tab 56 so the user can watch the initiated Workflow.

Figure 10:
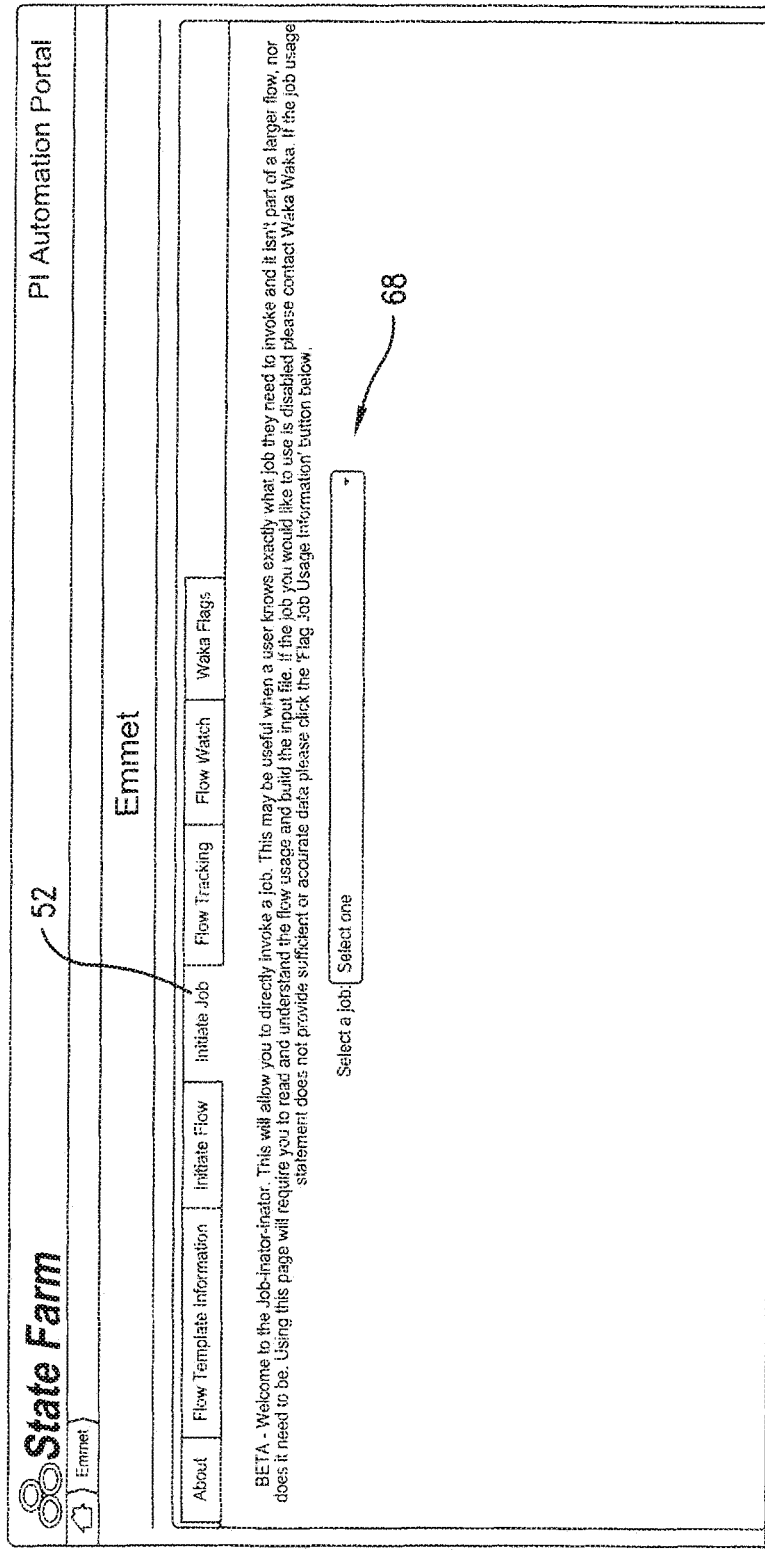
FIG. 10 is a screen capture associated with a third exemplary tab or screen.
Figure 11:
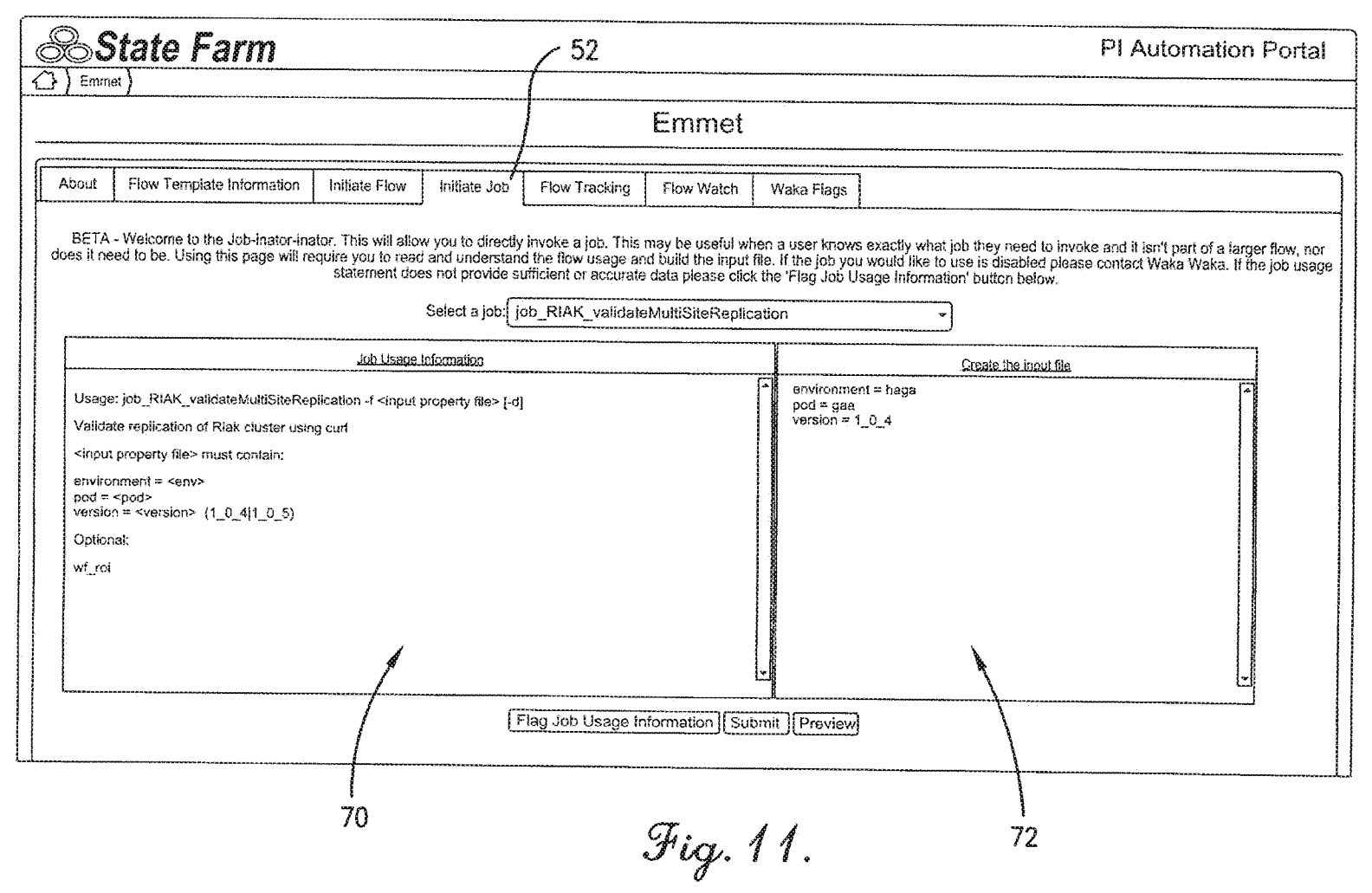

Referring to FIGS. 10 and 11, the Initiate Job tab 52 may allow users to initiate particular jobs, especially when those jobs are not part of larger Workflows. The user may be presented with a pulldown list of selectable jobs 68. Selecting a particular job may cause to appear a Job Usage Information box 70 and a Create the Input File box 72. The Job Usage Information box 70 may provide information to help the user understand which inputs are required for the selected job. The Create the Input File box 72 may allow the user to create for the selected job an input file which includes the required inputs identified in the Job Usage Information box 70. The user may be further presented with a plurality of selectable buttons, including a Preview button. Selecting the Preview button may automatically package the selected job as a Workflow and prepare it for execution. Selecting the Preview button may cause the User Interface to switch to the Flow Watch tab 56 to allow the user to preview the Workflow, and either make changes or start the Workflow.

Figure 12:
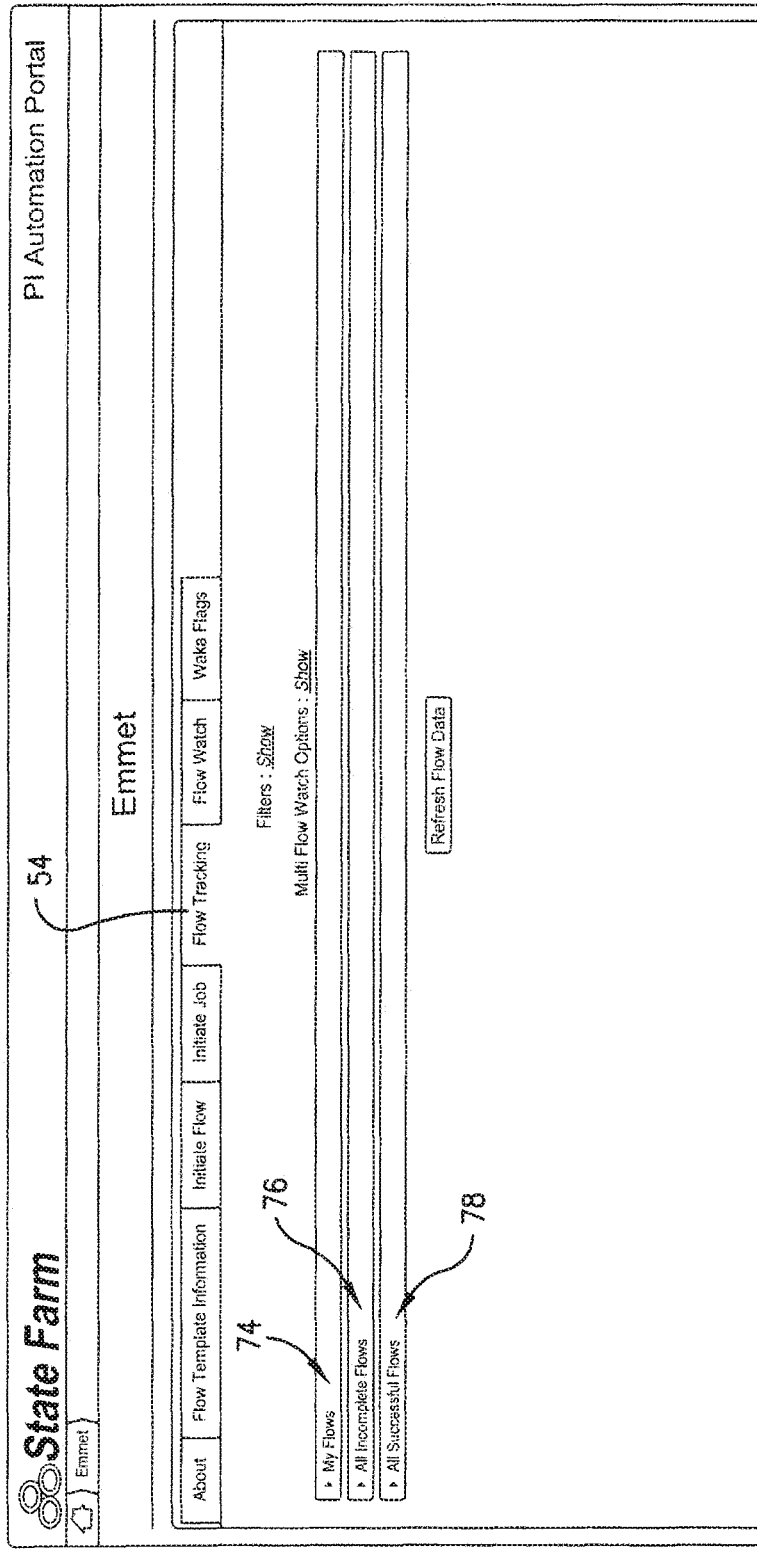
FIG. 12 is a screen capture associated with a fourth exemplary tab or screen.
Figure 13:
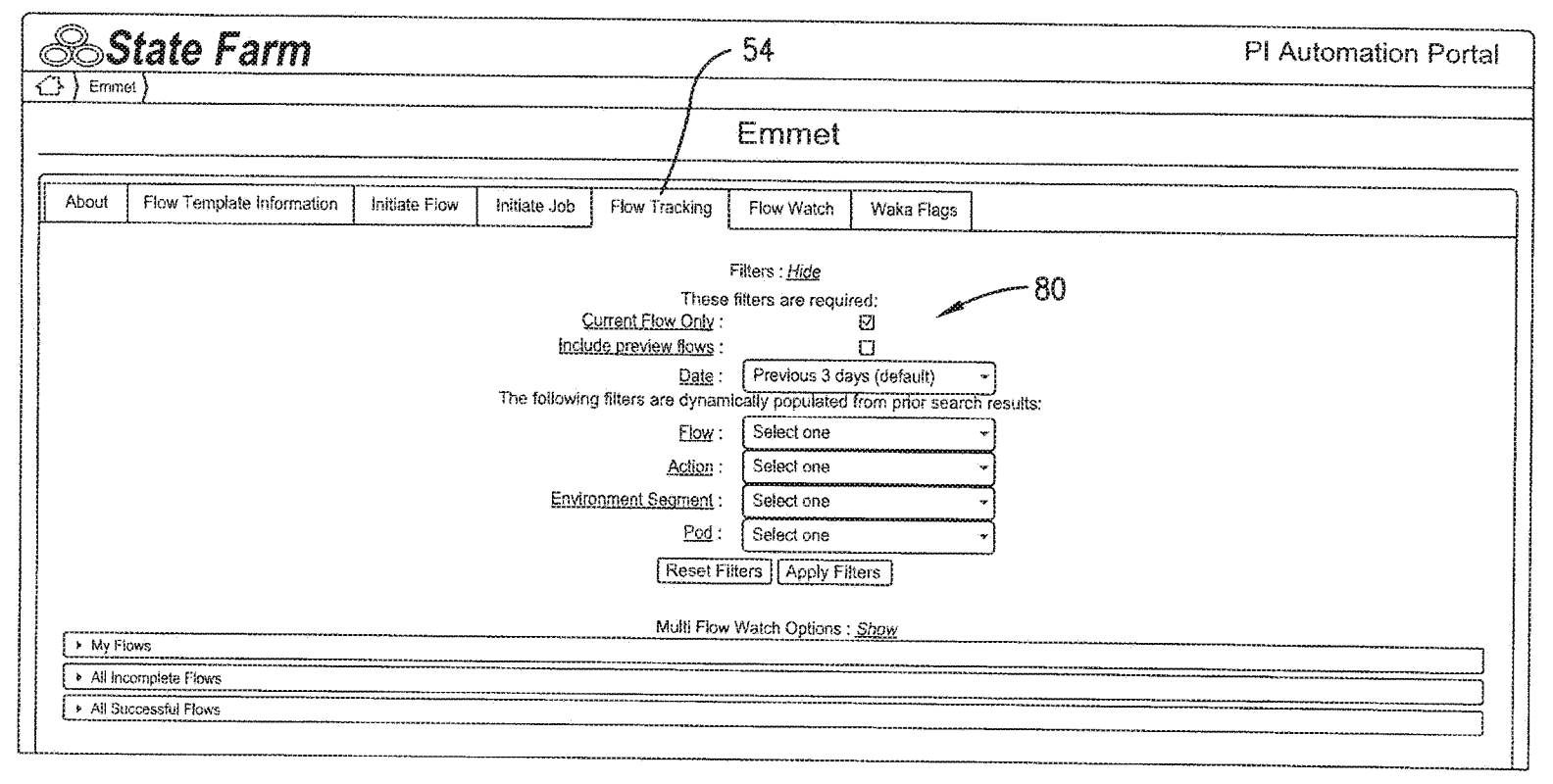

Referring to FIGS. 12, 13, and 14, the Flow Tracking tab 54 may allow users to view their own Workflows, incomplete Workflows, and successful Workflows. The user may be presented with a plurality of pulldown lists, including a pulldown list of their own Workflows 74, a pulldown list of incomplete Workflows 76, and/or a pulldown list of successful Workflows 78. The Flow Tracking tab 54 may further include a filter component 80 allowing the user to include and/or exclude certain Workflows from the pulldown lists 74,76,78. Filter criteria may include current Workflows, preview Workflows, time periods, Workflow names, Workflow actions, and Workflow targets. Some or all of these filter criteria may be selectable or otherwise specifiable using buttons or pulldown lists. Once the filter criteria are selected or otherwise specified and applied, any Workflows meeting the filter criteria may be displayed in the pulldown lists 74,76,78.

For each Workflow including in one of the pulldown lists 74,76,78, the user may be presented with a plurality of action buttons, including a Halt button, a Watch button, a View Timeline button, and/or a View Dependencies button. The Halt button may allow the user to stop the progress of the Workflow. The Watch button may allow the user to watch the progress of the Workflow. Selecting the View Timeline button may cause to be presented a timeline of the instantiations of the Workflow. Selecting the View Dependencies button may cause to be presented a dependency map (as previously described) for the Workflow.

The Flow Tracking tab 54 may further include a Multi Flow Watch component 82 allowing the user to more conveniently monitor a large implementation or upgrade of multiple Workflows against different targets. The user may be presented with a plurality of pulldown lists and/or action buttons, including a Refresh Interval list, a Show Summary Table button, an Enable Sound Alerts button, and/or a Minimize Data button. The Refresh Interval list may allow the user to specify the interval at which information in the Summary Table is refreshed. The Show Summary Table button may allow the user to have presented a table summarizing information of the multiple Workflows. The Enable Sound Alerts button may allow the user to receive audible alerts when a Workflow state changes between refresh periods. The Minimize Data button may allow the user to control the amount of information being reported.

Figure 15:
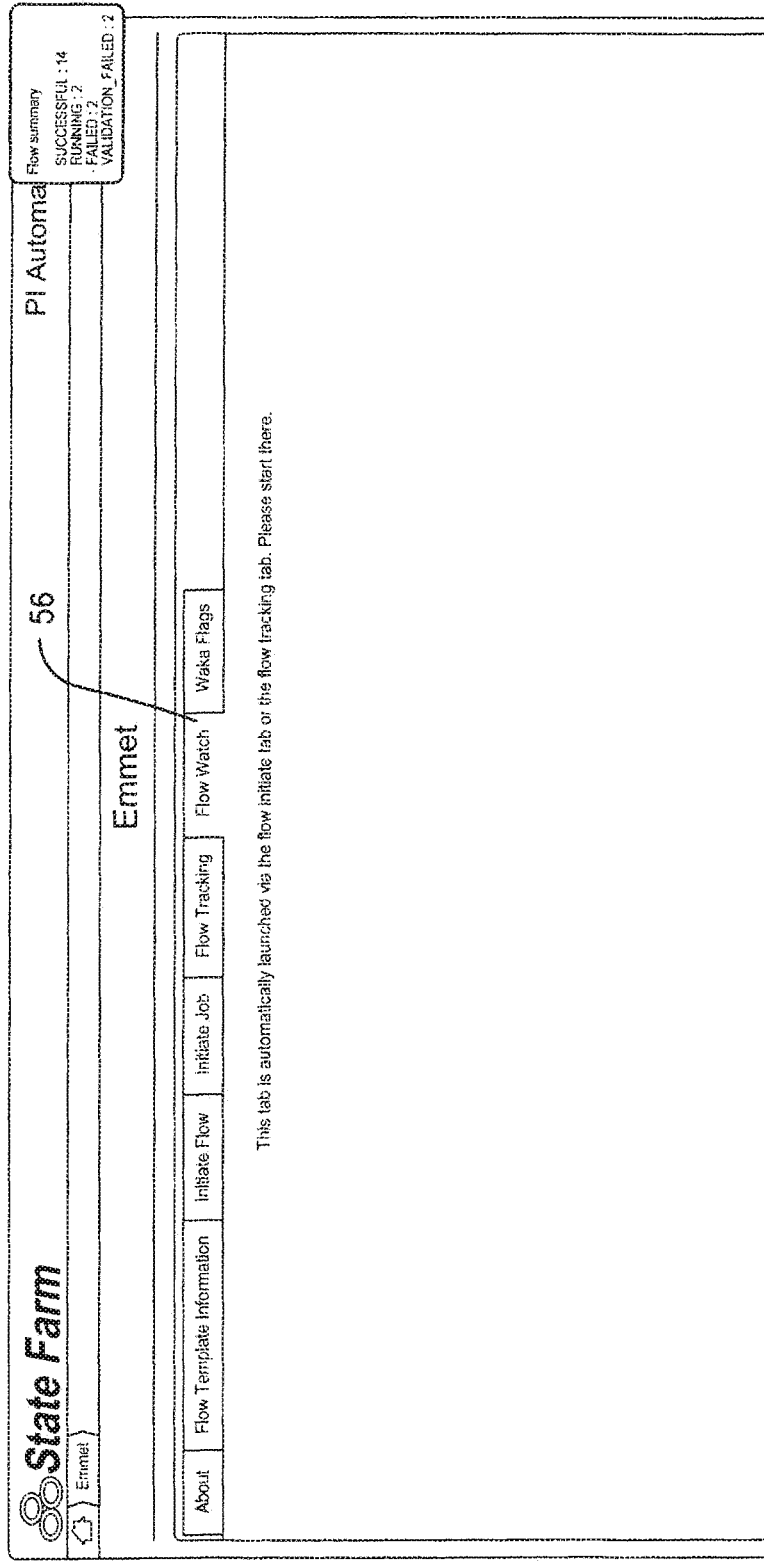
FIG. 15 is a screen capture associated with a fifth exemplary tab or screen.

Referring to FIGS. 15 and 16, The Flow Watch tab 56 may allow users to view information regarding a particular Workflow. The Flow Watch tab 56 may be automatically launched from the Initiate Flow tab 50, Initiate Job tab 52, or the Flow Tracking 54 tab. The user may be presented with a Flow Information Table 84 containing information about the Workflow, such as a status (e.g., incomplete, successful), a start date and time, and a finish date and time. The user may also be presented with a Job Information Table 86 containing information about all of the jobs associated with the Workflow, such as, for each job, a status, a start date and time, and a finish date and time. The user may be able to select an Admin button to allow the user to, for each job, view a job log which may help the user to understand, for example, when and why a failure may have occurred, and a job template showing any variables used by the job.

The Job Information Table 86 may also include, for each job, a pulldown list allowing the user to change the status of the job. For example, if the Workflow has failed due to the failure of a particular job, the user can change the status of that job (e.g., from "failed" to "successful", or from "successful" to "rerun") so that the Workflow can continue running. The Job Information Table 86 may further include an Export button allowing the user to export the some or all of the fields of the Job Information Table to a spreadsheet.

Figure 18:
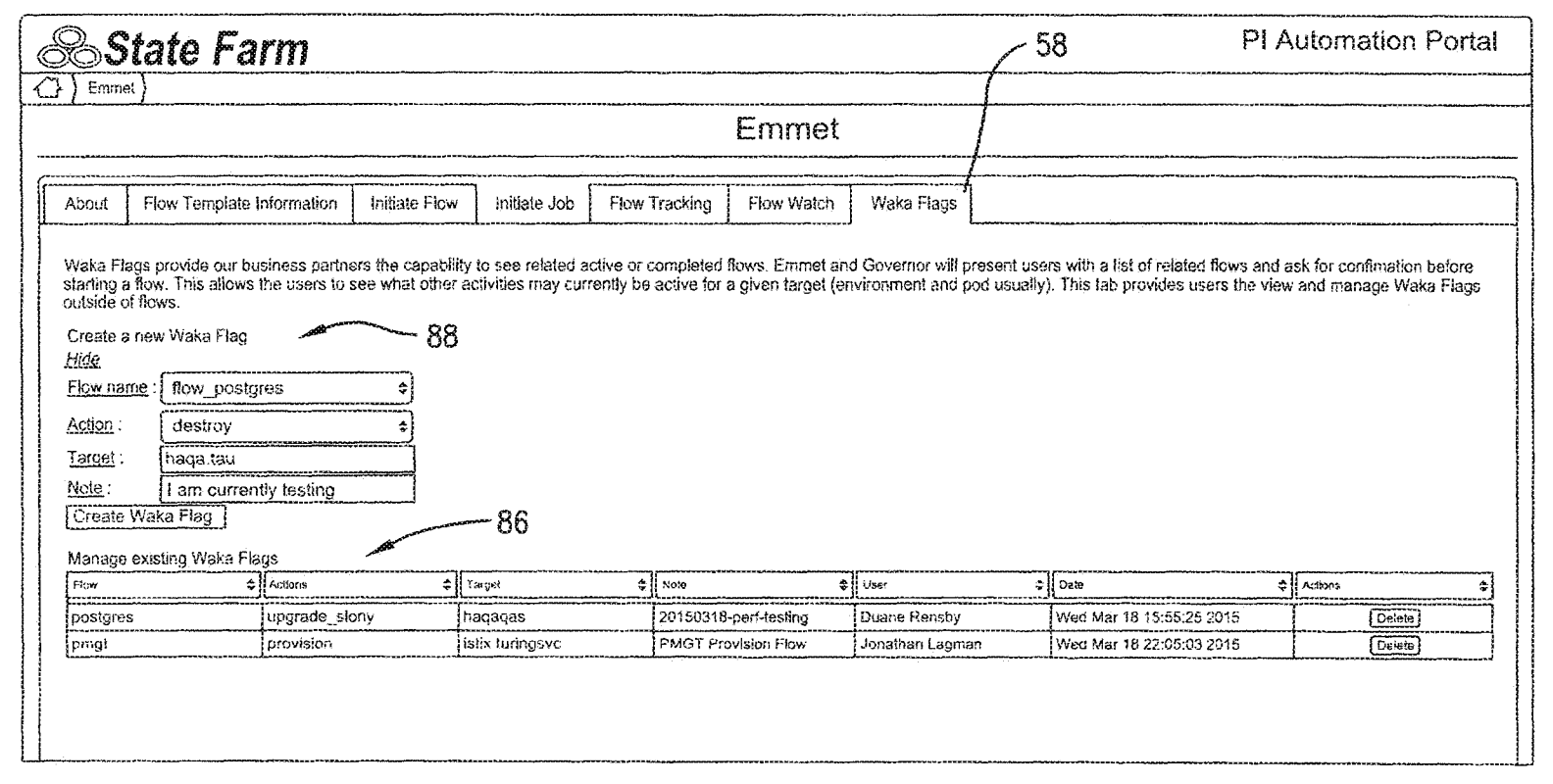

Referring to FIGS. 17 and 18, the Flag tab 58 may allow users to view and manage existing Conflict Flags and create new Conflict Flags, especially with regard to Workflows having the same targets (e.g., environments, pods). With regard to a component for viewing and managing existing Flags 86, the user may be presented with a plurality of fields, including a Flow field, an Action field, a Target field, a Note field, a User field, and/or a Date field, as well as an Action button. The Flow field may be a name identifying a particular Workflow. The Action field may identify the purpose of the Workflow (e.g., upgrade, destroy). The Target field may identify the environment and pod target of the Workflow. The Note field may allow the user of the Workflow to provide a short description of that Workflow's activities for users of other Workflows. The User field may identify the user of the Workflow. The Date field may identify the date and time the Flag was created. Most Flags may be automatically added and removed as the Workflow progresses. However, the Action button may allow for manually deleting a Flag.

With regard to a component for creating a new Flag 88, the user may be presented with a plurality of fields, including a Flow Name field, an Action field, a Target field, and/or a Note field, as well as a Create button. The Flow Name field allows for entering a name identifying a Workflow. The Flow Name field may provide a pulldown list of selectable Workflow names from which the user may choose. The Action field allows for identifying a purpose of the Workflow. The Action field may provide a pulldown list of selectable actions from which the user may choose. The Create button may be selectable to create the new Flag and add it to the list of existing Flags. Thereafter, if another user attempts to initiate a Workflow having the same target, the user may be notified of the Flag and the potential conflict.

In one implementation, multiple Workflows may be related, or "chained" together, in which a first, or "parent," Workflow may include a command to initiate one or more second, or "child," Workflows. Once such a second Workflow is running, the user may interact directly with the second Workflow (e.g., resume, reset, change job states), leaving the first Workflow unaware of the actual state of the second Workflow. The first Workflow may include a first job configured to query the state of the second Workflow prior to initiating the second Workflow, and take appropriate action based upon the state. The first Workflow may further include a second job configured to save information regarding the first Workflow in the state of the second Workflow, and to automatically update the first job's status when the second Workflow is directly resumed (rather than resumed via the first Workflow). The first and second Workflows may be configured to include one or more fields, commands, or other conventions to facilitate the relationship between them.

The computer-implemented method may include additional, fewer, or alternative steps, including those discussed elsewhere herein.

III. Exemplary Computer-Readable Medium

A non-transitory computer-readable medium with an executable program stored thereon may be provided for configuring and managing aspects of a Workflow. The Workflow may include a plurality of jobs, and each job may include one or more parameters and one or more dependencies on other jobs. The program may instruct the processing element 38 of the computing system 30 to perform various actions. Referring again to FIG. 3, among the various actions that the program may instruct the processing element 38 to perform, the User Interface 22 may be configured to allow a user to access the library of existing jobs 24 and select one or more jobs from the library of existing jobs 24 to include among the plurality of jobs in the Workflow, as shown in action 102. The User Interface 22 may be configured to allow the user to modify the parameters and/or dependencies of the selected jobs, as shown in action 104. Any such modifications may be substantially automatically translated to any of the selected jobs having dependencies on the modified jobs, as shown in action 106.

The User Interface 22 may be configured to allow the user to create one or more new jobs to include among the plurality of jobs in the Workflow, as shown in action 108. The Template 26 may be substantially automatically created which specifies the dependencies between the plurality of jobs, as shown in action 110. The User Interface 22 may be configured to allow the user to modify the Template 26, as shown in action 112. The Workflow may be executed in accordance with the Template 26, including communicating output data between the plurality of jobs to satisfy the dependencies, as shown in action 114.

The User Interface 22 may be configured to communicate a status of each job to the user as execution of the Workflow progresses, as shown in action 116. The User Interface 22 may be configured to allow the user to review the status of each job, view the dependencies of each job, track the progress of the Workflow, halt and resume the Workflow, and/or view a record of the Workflow, as shown in action 118. The program stored on the computer-readable medium may instruct the processing element 38 to perform additional, fewer, or alternative components or actions, including those discussed elsewhere herein, and particularly the additional features discussed in the section describing the computer-implemented method.

IV. Exemplary Operation

In an exemplary operation, the present embodiments may function substantially as follows. A common type of flow is to deploy an infrastructure product. In the prior art, deploying an instance of the PostgreSQL database to three data centers might involve manually completing the following tasks: check that various prerequisites are met; create LDAP groups that will control access to the database; create a network drive (NFS) in each data center for use by the new virtual servers; login to the provisioning product in each data center and deploy multiple virtual servers; gather the new server names from the prior step and configure network load-balancers in each data center; configure geographic load-balancing/DNS with the information from prior steps; and/or login to the primary server in each location and create the database and configure cross-site replication. These steps may require accessing several devices in multiple data centers and copying information from one step to the next, inevitably leading to misconfigurations that may go unnoticed until they cause later operations to fail, thereby decreasing availability to other applications. It also may take a human several hours to complete.

In contrast, the Workflow Engine 20 and User Interface 22 of the present invention may accomplish this deployment with a few initial inputs from the administrator, resulting in a more accurate and consistent configuration. More specifically, a list of the jobs for this flow may include the following: DB createDefaultDB; DB installScriptsRPM-dbprimary; DB setupSlony-add-slave; DB setup Slony-config-master; DB setup Slony-subscribe-slave; DNS createAlias-dat-global; DNS createAlias-datro-global; DNS createAlias-etl; DNS createAlias-pem; DNS delegation-internal-datga; DNS delegation-internal-dat; DNS delegation-internal-datro; GTM createPool-internal-datga; GTM createPool-internal-dat; GTM createPool-internal-datro; GTM createWideIp-internal-datga; GTM createWideIp internal-dat; GTM createWideIp-internal-datro; LDAP createAppUsers-prod; LDAP createAppUsers-test; LDAP createGroups-formal; LDAP createGroups-informal; LDAP createGroups-prod; LTM createPool-internal-datga; LTM createPool-internal-dat; LTM createPool-internal-datro; LTM createVirtual-internal-datga; LTM createVirtual-internal dat; LTM createVirtual-internal-datro; NFS createIfsExport; VM_provision-dbga; VM_provi si on-db primary; VM_provision-db standby VM_provision-dbtdm; VMprovision-pem. In more detail, the job template VM_provision-dbprimary may contain:

1. job.description=Provision primary VM in ${location}
2. job.timeout=180
3. job.dependency1=NFS createIfsExport-${location}
4. #Job inputs:
5. environment=${environment}
6. pod=${pod}
7. location=${location}
8. tpo_buildid=${tpo_buildid}
9. blueprint=${blueprint.dbprimary}
10. icptp_pem_server=${job VM_provision-pem-${location} hostname}
11. icptp_db_configuration_name=${db_cfg name}
12. VirtualMachine.CPU.Count=${cpu_count}
13. VirtualMachine.Memory.Size=${memory_size}
14. VirtualMachine.Disk1.Size=${disk1_size}
15. . . . .

This Template 26 may provide the Workflow Engine 20 with all the data needed to invoke the job and key information for sequencing job execution. In particular, Line 3 contains an explicit dependency wherein the job cannot run until the NFS createIfsExport job has run in the same data center (location), and Line 10 contains an implicit dependency wherein the "hostname" output from job VM provision-pem in this location needs to be fed into this job. The Workflow Engine 20 will not execute this job until both dependencies are met. It then retrieves the "hostname" output from job VM_provision-pem in the same data center at which this job is to be executed and substitute that value into line 10. It may also substitute all other ${ . . . } variables based upon inputs from the User Interface 22 or other data provided with the Template 26. These resulting values are then fed to the job for provisioning a virtual server. Because the Template 26 may be used for all three data centers, the three primary database servers may have identical configurations. The Workflow Engine 20 may also keep track of which jobs are complete. When a job fails, the Workflow may halt and wait for manual intervention to resolve the issue. When the Workflow is resumed, jobs that had already completed may be skipped and the Workflow may begin processing where it halted.

V. Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity or group of tangible entities, be that entities that are physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time. Moreover, the "processing element" may, unless more narrowly described, consist of multiple separate tangible pieces of hardware for operating in the described manner to perform certain operations described herein.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although embodiments of the present inventive concept have been described with reference to the illustrations in the attached drawing figures, it is noted that equivalents may be employed and substitutions made herein without departing from the scope of the present inventive concept as recited in the claims. Having thus described various embodiments of the present inventive concept, what is claimed as new and desired to be protected by Letters Patent includes the following:

The invention claimed is:

1. A computer-implemented method for configuring and managing aspects of a workflow, wherein the workflow includes a plurality of jobs, and wherein each job includes one or more parameters and one or more dependencies on other jobs, the computer-implemented method comprising: providing a library of existing jobs stored on a memory element; configuring a user interface to allow a user to access the library of existing jobs and select one or more jobs from the library of existing jobs to include among the plurality of jobs in the workflow, wherein the user interface is configured to: provide the user with information about any available workflows and workflow actions, and to allow the user to view a template file within each workflow action; allow the user to identify a particular workflow and initiate a workflow action; allow the user to identify and initiate a particular job; allow the user to view a list of the any available workflows, filter the list of the any available workflows according to one or more criteria, select the particular workflow from the list of any available workflows, and view information about the particular workflow, and to allow the user to view a map of the dependencies for the particular workflow; allow the user to view information regarding the particular workflow, including a workflow status, a workflow start time, and a workflow end time, and to view information regarding one or more jobs associated with the particular workflow, including a job status, a job start time, a job end time, and a job log; allow the user to view and manage one or more existing flags and to create one or more new flags when two or more workflows have a same target; and allow the user to modify the one or more parameters and one or more dependencies of the selected one or more jobs; automatically translating any such modifications to any of the selected one or more jobs having dependencies on the modified jobs; and executing the particular workflow in accordance with the template, including communicating output data between the plurality of jobs to satisfy the dependencies.

2. The computer implemented method of claim 1, wherein:
configuring the user interface further includes the user interface configured to:
allow the user to create one or more new jobs to include among the plurality of jobs in the workflow;
allow the user to modify the template;
communicate a status of each job to the user as execution of the workflow progresses; and
allow the user to review the status of each job, view the one or more dependencies of each job, track the progress of the workflow, halt and resume the workflow, and view a record of the workflow to facilitate configuring and managing aspects of the workflow; and
the method further includes:
automatically creating a template which specifies the dependencies between the plurality of jobs.

3. The computer-implemented method of claim 1, wherein the user interface is a common interface for configuring and managing aspects of a plurality of different workflows.

4. The computer-implemented method of claim 1, wherein the computer implemented method is performed on a single virtual machine with no external databases.

5. The computer-implemented method of claim 1, wherein the plurality of jobs are written in different programming languages.

6. The computer-implemented method of claim 1, further comprising:
prescribing a standard interface for invoking each job;
prescribing a standard output convention for indicating success or failure of each job and for sharing data between the plurality of jobs; and
prescribing a standard set of parameters for invoking the workflow.

7. The computer-implemented method of claim 1, further comprising prescribing a set of rules for declaring an execution sequence of the plurality of jobs.

8. The computer-implemented method of claim 1, further comprising defining a filtering mechanism for declaring whether a particular job should be excluded from the workflow based upon a run-time context during execution of the workflow.

9. The computer-implemented method of claim 1, further comprising defining a cloning mechanism for generating multiple jobs from a single job specification based upon a dynamic output during execution of the workflow.

10. The computer-implemented method of claim 1, further comprising defining a file template format for generating a set of job specifications, wherein generating the set of job specifications includes one or more actions selected from the group consisting of: substituting a variable, replicating an input based upon a variable containing a value, managing a variable that references an output from another job, and defining a dependency, filter, and clone for a particular job.

11. The computer-implemented method of claim 1, further comprising configuring the user interface to allow the user to execute the workflow in a preview mode in order to provide the user with a listing of one or more actual jobs that would execute in a particular context, but without actually executing the one or more actual jobs.

12. The computer-implemented method of claim 1, further comprising automatically assigning each job a job type from a plurality of predefined job types, and configuring the user interface to allow the user to change the job type of each job, wherein the plurality of predefined job types include:
a normal job type which identifies a job that can be automatically executed to successful completion;
a validation job type which identifies a job that makes no changes but rather gathers data for use by other jobs; and
a human job type which identifies a job that requires human intervention to complete.

13. The computer-implemented method of claim 11, further comprising configuring the user interface to allow the user to change the job types of the plurality of jobs with a single command.

14. The computer-implemented method of claim 1, further comprising:
tracking the statuses of the plurality of jobs as the workflow progresses; and
configuring the user interface to allow the user to resume execution of the workflow at a point of failure, based upon the tracked statuses of the jobs at the point of failure.

15. The computer-implemented method of claim 1, further comprising preserving the output data of the plurality of jobs.

16. The computer-implemented method of claim 1, further comprising tracking one or more invocation parameters of the workflow.

17. The computer-implemented method of claim 1, further comprising configuring the user interface to allow the user to change the status of one or more jobs of the plurality of jobs.

18. The computer-implemented method of claim 1, further comprising locking a target to prevent multiple users from running the same workflow against the target at the same time.

19. A non-transitory computer-readable medium with an executable program stored thereon for configuring and managing aspects of a workflow, wherein the workflow includes a plurality of jobs, wherein each job includes one or more parameters and one or more dependencies on other jobs, wherein the program instructs a processing element of a computing device to perform the following steps: providing a library of existing jobs stored on a memory element; configuring a user interface to allow a user to access the library of existing jobs and select one or more jobs from the library of existing jobs to include among the plurality of jobs in the workflow, wherein the user interface is configured to: provide the user with information about any available workflows and workflow actions, and to allow the user to view a template file within each workflow action; allow the user to identify a particular workflow and initiate a workflow action; allow the user to identify and initiate a particular job; allow the user to view a list of the any available workflows, filter the list of the any available workflows according to one or more criteria, select the particular workflow from the list of any available workflows, and view information about the particular workflow, and to allow the user to view a map of the dependencies for the particular workflow; allow the user to view information regarding the particular workflow, including a workflow status, a workflow start time, and a workflow end time, and to view information regarding one or more jobs associated with the particular workflow, including a job status, a job start time, a job end time, and a job log; allow the user to view and manage one or more existing flags and to create one or more new flags when two or more workflows have a same target; and allow the user to modify the one or more parameters and one or more dependencies of the selected one or more jobs; automatically translating any such modifications to any of the selected one or more jobs having dependencies on the modified jobs; and executing the particular workflow in accordance with the template, including communicating output data between the plurality of jobs to satisfy the dependencies.

20. A computing system for configuring and managing aspects of a workflow, wherein the workflow includes a plurality of jobs, wherein each job includes one or more parameters and one or more dependencies on other jobs, the device comprising: a communication element configured to receive and transmit communications via a network; a memory element configured to store a library of existing jobs, and a processing element electronically coupled to the communication element and the memory element and configured to perform the following steps: providing a library of existing jobs stored on a memory element; configuring a user interface to allow a user to access the library of existing jobs and select one or more jobs from the library of existing jobs to include among the plurality of jobs in the workflow, wherein the user interface is configured to: provide the user with information about any available workflows and workflow actions, and to allow the user to view a template file within each workflow action; allow the user to identify a particular workflow and initiate a workflow action; allow the user to identify and initiate a particular job; allow the user to view a list of the any available workflows, filter the list of the any available workflows according to one or more criteria, select the particular workflow from the list of any available workflows, and view information about the particular workflow, and to allow the user to view a map of the dependencies for the particular workflow; allow the user to view information regarding the particular workflow, including a workflow status, a workflow start time, and a workflow end time, and to view information regarding one or more jobs associated with the particular workflow, including a job status, a job start time, a job end time, and a job log; allow the user to view and manage one or more existing flags and to create one or more new flags when two or more workflows have a same target; and allow the user to modify the one or more parameters and one or more dependencies of the selected one or more jobs; automatically translating any such modifications to any of the selected one or more jobs having dependencies on the modified jobs; and executing the particular workflow in accordance with the template, including communicating output data between the plurality of jobs to satisfy the dependencies.

* * * * *